United States Patent
Matsumoto et al.

(10) Patent No.: US 7,580,345 B2
(45) Date of Patent: Aug. 25, 2009

(54) RADIO TRANSMITTING APPARATUS AND RADIO TRANSMITTING METHOD

(75) Inventors: Atsushi Matsumoto, Kanazawa (JP); Kenichi Miyoshi, Yokohama (JP); Akihiko Nishio, Yokosuka (JP)

(73) Assignee: Panasonic Corporation, Osaka (JP)

( * ) Notice: Subject to any disclaimer, the term of this patent is extended or adjusted under 35 U.S.C. 154(b) by 450 days.

(21) Appl. No.: 10/568,448

(22) PCT Filed: Aug. 18, 2004

(86) PCT No.: PCT/JP2004/011851

§ 371 (c)(1),
(2), (4) Date: Apr. 7, 2006

(87) PCT Pub. No.: WO2005/018126

PCT Pub. Date: Feb. 24, 2005

(65) Prior Publication Data

US 2006/0256755 A1    Nov. 16, 2006

(30) Foreign Application Priority Data

Aug. 19, 2003   (JP)   ............... 2003-295614

(51) Int. Cl.
*H04J 11/00* (2006.01)
(52) U.S. Cl. ..................................... 370/208
(58) Field of Classification Search ................. 370/335, 370/329, 328, 310, 208–209, 204, 320, 342, 370/441; 375/148, 147, 146, 140, 130, 260; 708/410; 455/102
See application file for complete search history.

(56) References Cited

U.S. PATENT DOCUMENTS

| 2001/0055319 | A1* | 12/2001 | Quigley et al. ............... 370/480 |
| 2003/0185179 | A1 | 10/2003 | Inogai et al. |
| 2004/0213144 | A1 | 10/2004 | Murakami et al. |
| 2004/0228391 | A1* | 11/2004 | Sommer et al. ............. 375/148 |

FOREIGN PATENT DOCUMENTS

JP    2003-032226    1/2003

(Continued)

OTHER PUBLICATIONS

PCT International Search Report dated Nov. 30, 2004.

(Continued)

*Primary Examiner*—Kwang B Yao
*Assistant Examiner*—Tung Q Tran
(74) *Attorney, Agent, or Firm*—Dickinson Wright, PLLC

(57) ABSTRACT

A radio transmission apparatus capable of performing communications with high transmission efficiency. In this apparatus, modulator (2802) modulates data and outputs to spreader (2804). Modulator (2803) modulates data under a modulation scheme having a higher M-ary number than modulator (2802) and outputs the modulated data to spreader (2805). Spreader (2804) spreads the data and outputs the spread data to frequency domain mapping section (2807). Spreader (2805) spreads the data and outputs the spread data to time domain mapping section (2808). Frequency domain mapping section (2807) maps chips with spread data on subcarriers in the frequency domain and outputs the data with chips mapped on subcarriers to IFFT section (107). Time domain mapping section (2808) maps chips with spread data on subcarriers in the time domain and outputs the data with chips mapped on subcarriers to IFFT section (107).

6 Claims, 31 Drawing Sheets

FOREIGN PATENT DOCUMENTS

| | | |
|---|---|---|
| JP | 2003-046474 | 2/2003 |
| JP | 2003-152679 | 5/2003 |

OTHER PUBLICATIONS

K. Tsukagoshi, et al., "MC-CDMA Tekio Hencho System no Phasing Denpanro ni Okeru Denso Tokusei," The Institute of Electronics, Information and Communication Engineers Gijutsu Kenkyu Hokoku, vol. 101, No. 437, Nov. 13, 2001, pp. 7-12, Fig. 1, with English translation thereof.

A. Masui, et al., "MC-CDMA Hoshiki ni Okeru Tekio Hencho ni Kansuru-Kento," The Institute of Electronics, Information and Communication Engineers Gijutsu Kenkyu Hokoku, vol. 101, No. 545, Jan. 4, 2002, pp. 119-126, Fig. 2, with English translation thereof.

H. Sano, et al., "A Multicarrier CDMA Scheme with Spreading in Time and Frequency Domains," 2000 Proceeding of the Society Conference of IEICE 1, Sep. 7, 2000, pp. 378.

* cited by examiner

RADIO TRANSMITTING APPARATUS AND RADIO TRANSMITTING METHOD

TECHNICAL FIELD

The present invention relates to an apparatus and method for radio transmission.

BACKGROUND ART

As a method of transmitting a large volume of data at a high speed, a system combining an OFDM (Orthogonal Frequency Division Multiple) and CDMA is under study in recent years. As a system combining OFDM and CDMA, there are two schemes; a scheme whereby chips with spread data are mapped on subcarriers in a frequency domain and a scheme whereby chips with spread data are mapped on subcarriers in a time domain.

When data is spread in the frequency domain, there may be violent propagation channel variation in the frequency domain caused by frequency selective fading due to a multipath environment, which causes orthogonality among spreading codes to be lost deteriorating its reception characteristic though a frequency diversity effect can be obtained during despreading.

When data is spread in the time axis domain, a variation in the propagation channel in the time axis domain is relatively moderate compared to that in the frequency domain, and therefore little frequency diversity effect is obtained, but orthogonality among spreading codes is maintained. However, data assigned to subcarriers with sharp drops has a very low reception SNR, and therefore there is a high probability that the data may be completely erroneous.

Especially when codes are multiplexed using M-ary modulation such as 16QAM, deterioration of reception performance due to loss of orthogonality among spreading codes is drastic, and therefore spreading in the time axis domain has a better characteristic than spreading in the frequency domain.

DISCLOSURE OF INVENTION

Problems to be Solved by the Invention

However, both methods of the conventional apparatus have advantages and disadvantages and have a problem that it is difficult to improve transmission efficiency by combining OFDM and CDMA.

It is an object of the present invention to provide an apparatus and method for radio transmission capable of carrying out communications with high transmission efficiency.

Means for Solving the Problem

The radio transmission apparatus according to the present invention is a radio transmission apparatus that transmits a radio signal consisting of a plurality of subcarriers and adopts a configuration comprising a modulator that modulates transmission data using a first modulation scheme to obtain first modulated data and modulates the transmission data using a second modulation scheme of a higher modulation M-ary number than the first modulation scheme to obtain second modulated data, a spreader that spreads the first modulated data to obtain a plurality of first chips and spreads the second modulated data to obtain a plurality of second chips and a mapping unit that maps the first chips on a plurality of first subcarriers mapped in the frequency domain and maps the second chips on a plurality of second subcarriers mapped in the time domain.

Advantageous Effect of the Invention

According to the present invention, it is possible to realize communications with a high degree of transmission efficiency.

BEST MODE FOR CARRYING OUT THE INVENTION

Now, embodiments of the present invention will be described in detail with reference to the accompanying drawings below.

Embodiment 1

Figure 1:
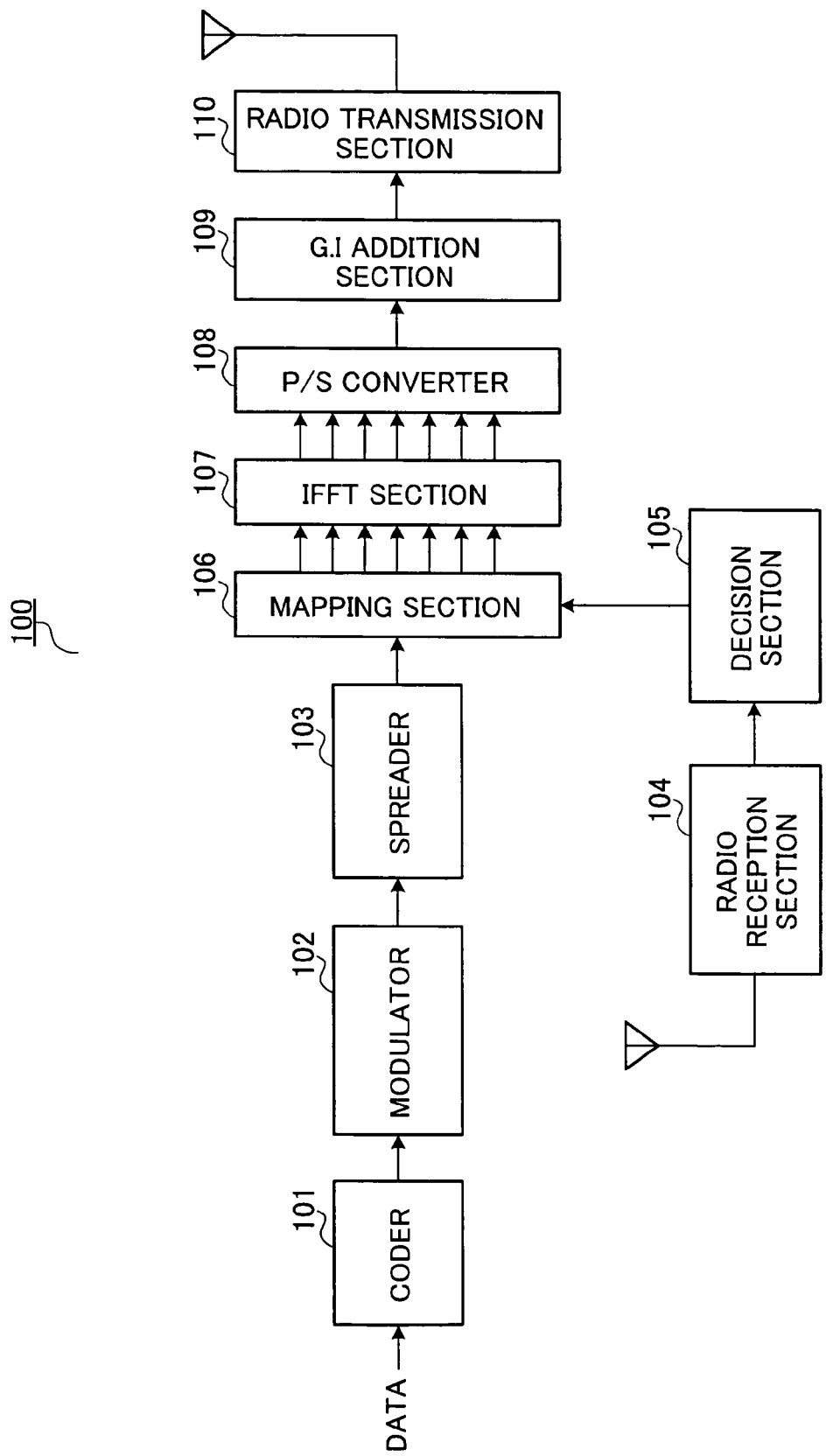
FIG. 1 is a block diagram showing the configuration of a radio communication apparatus according to Embodiment 1 of the present invention.

FIG. 1 is a block diagram showing the configuration of a radio communication apparatus according to Embodiment 1 of the present invention. The radio communication apparatus 100 in FIG. 1 is principally comprised of coder 101, modulator 102, spreader 103, radio reception section 104, decision section 105, mapping section 106, IFFT section 107, P/S converter 108, G.I addition section 109 and radio transmission section 110.

In FIG. 1, coder 101 codes data to be transmitted and outputs the data to modulator 102. Modulator 102 modulates the data and outputs the modulated data to spreader 103. Spreader 103 multiplies the data by a spreading code and outputs the multiplication result to mapping section 106.

Radio reception section 104 receives a radio signal transmitted from the other communication party, amplifies, converts the signal to a signal with a baseband frequency, demodulates and decodes it to obtain information about propagation channel quality of each subcarrier. Radio reception section 104 outputs the information about the propagation channel quality to decision section 105. Decision section 105 decides whether the propagation channel quality is equal to or higher or lower than a predetermined level for each subcarrier and outputs the decision result to mapping section 106.

Mapping section 106 maps chips with spread data in the time axis domain. Furthermore, mapping section 106 maps chips with spread data on subcarriers having propagation channel quality lower than a predetermined level in the frequency domain. Mapping section 106 then outputs the data (chips) mapped on the respective subcarriers to IFFT section 107.

IFFT section 107 applies an inverse fast Fourier transform to the data mapped on the respective subcarriers and outputs the converted data to P/S converter 108. P/S converter 108 converts the data after IFFT from parallel to serial and outputs the serial data to G.I addition section 109.

G.I addition section 109 adds a guard interval to the data and outputs it to radio transmission section 110. Radio transmission section 110 converts the data to data with a radio frequency.

Figure 2:
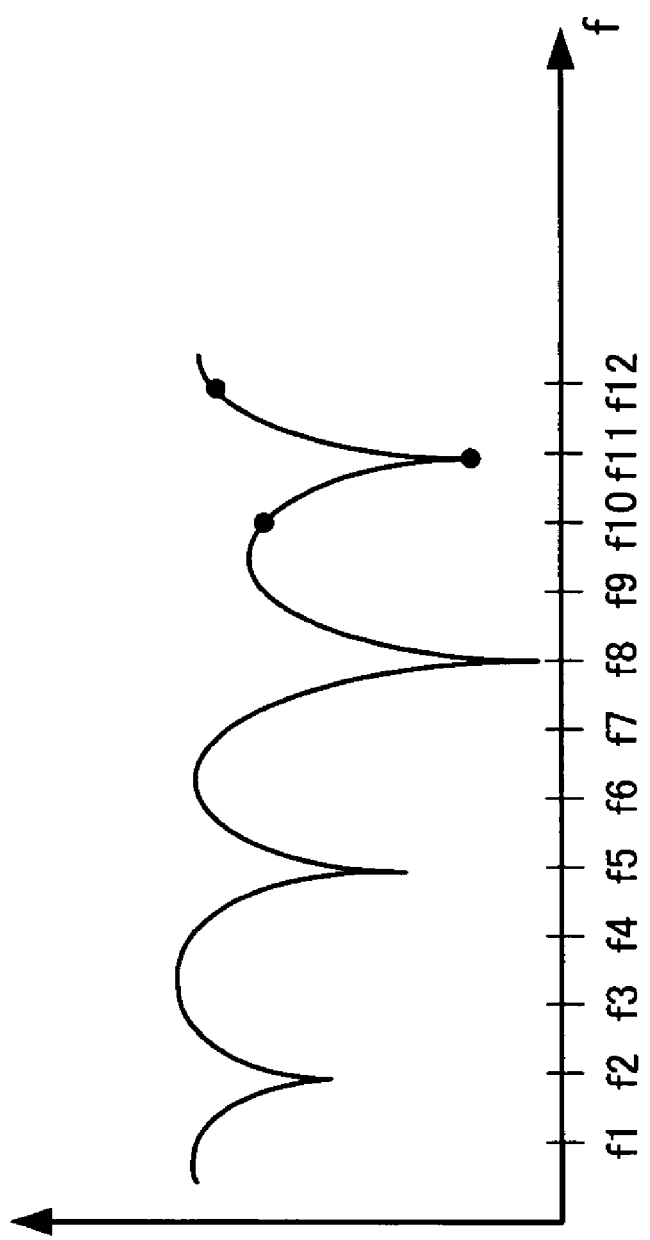
FIG. 2 illustrates an example of channel variations in the frequency domain.

Next, the operation of data arrangement of the radio communication apparatus according to this embodiment will be explained. FIG. 2 illustrates an example of channel variations in the frequency domain. In FIG. 2, the vertical axis shows a reception level and the horizontal axis shows a frequency. Furthermore, f1 to f12 show subcarrier frequencies. In FIG. 2, signals having f2, f5, f8, f11 have very low reception levels due to frequency selective fading. The level differences among frequencies are very large. For example, the level difference between the signal having f10 and signal having f11 and the level difference between the signal having f11 and signal having f12 are very large.

Figure 3:
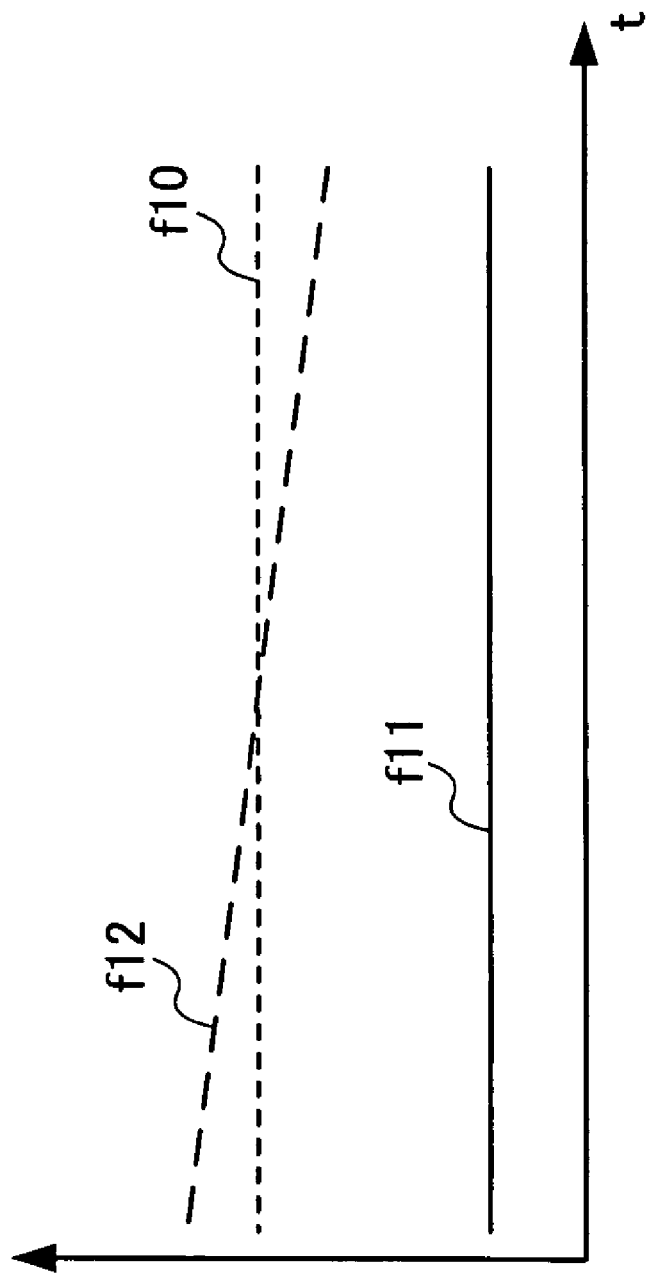
FIG. 3 illustrates an example of a channel variation on a time axis.

On the other hand, variations of the respective frequencies in the time domain have smaller level differences than variations in the frequency domain. FIG. 3 illustrates an example of a channel variation on a time axis. In FIG. 3, the vertical axis shows a reception level and the horizontal axis shows a time. The reception level in FIG. 3 is expressed on the same scale as that of the reception level in FIG. 2.

FIG. 3 shows variations in the time domain of the signals having frequencies f10, f11 and f12 in FIG. 2. It is appreciated that variations of the respective signals in the time domain have smaller level differences than those in FIG. 2.

Therefore, the present invention transmits chips with spread data mapped on carriers having reception levels equal to or higher than a predetermined level in the time domain and transmits chips with spread data mapped on carriers having reception levels lower than a predetermined level in the frequency domain.

Figure 4:
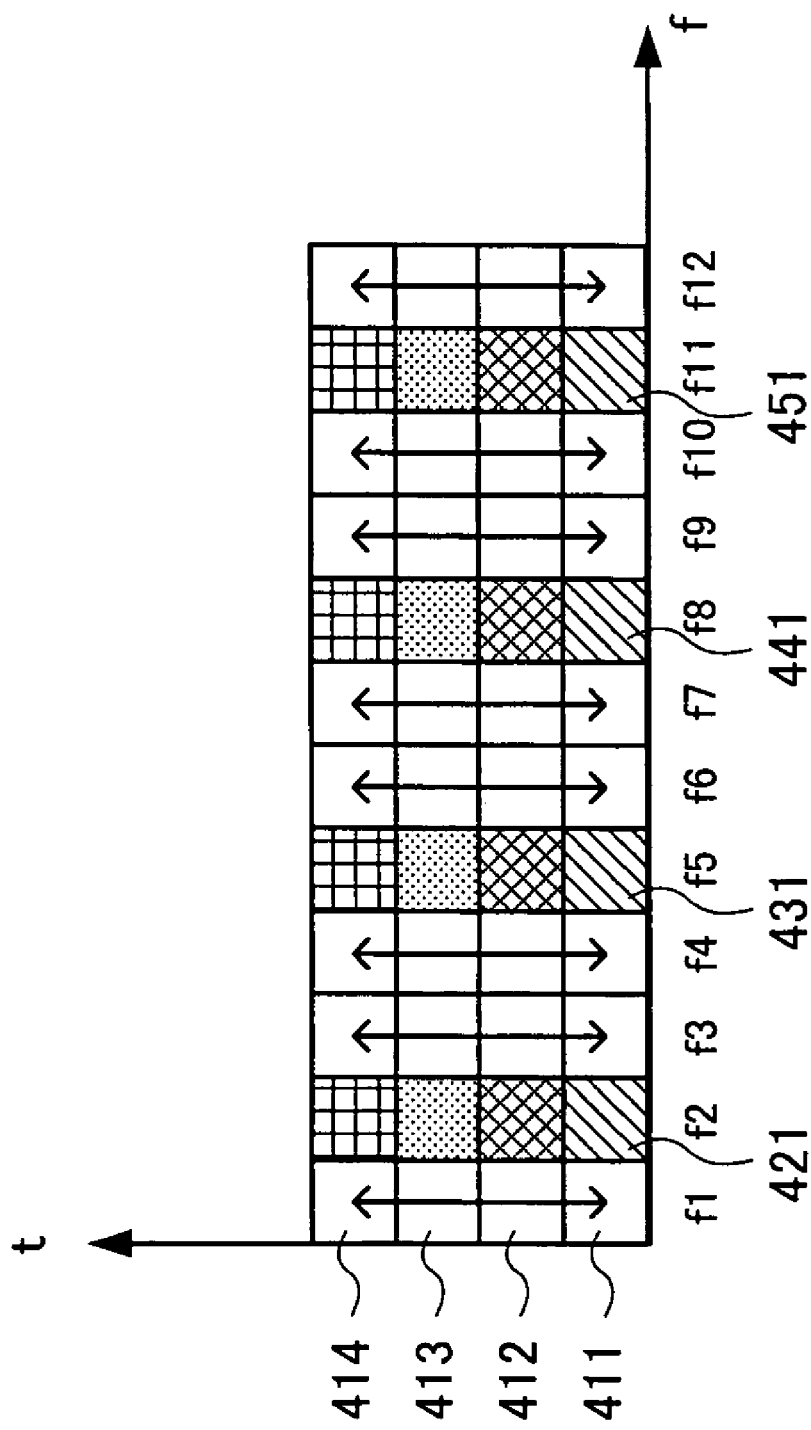
FIG. 4 illustrates an example of chip arrangement of a radio communication apparatus of the above described embodiment.

FIG. 4 illustrates an example of chip arrangement of a radio communication apparatus of this embodiment. In FIG. 4, the vertical axis shows a time and the horizontal axis shows a frequency. Furthermore, frequencies f1 to f12 in FIG. 4 correspond to frequencies f1 to f12 in FIG. 2.

Radio communication apparatus 100 maps chips with spread data on subcarriers having frequencies f1, f3, f4, f6, f7, f9, f10 and f12 having reception levels equal to or higher than a predetermined level in the time domain. For example, chips obtained by spreading transmission data are mapped at positions 411, 412, 413 and 414.

Radio communication apparatus 100 then maps chips with spread data on subcarriers having frequencies f2, f5, f8 and f11 having reception levels lower than a predetermined level in the frequency domain. For example, chips obtained by spreading transmission data are mapped at positions 421, 431, 441 and 451.

Figure 5:
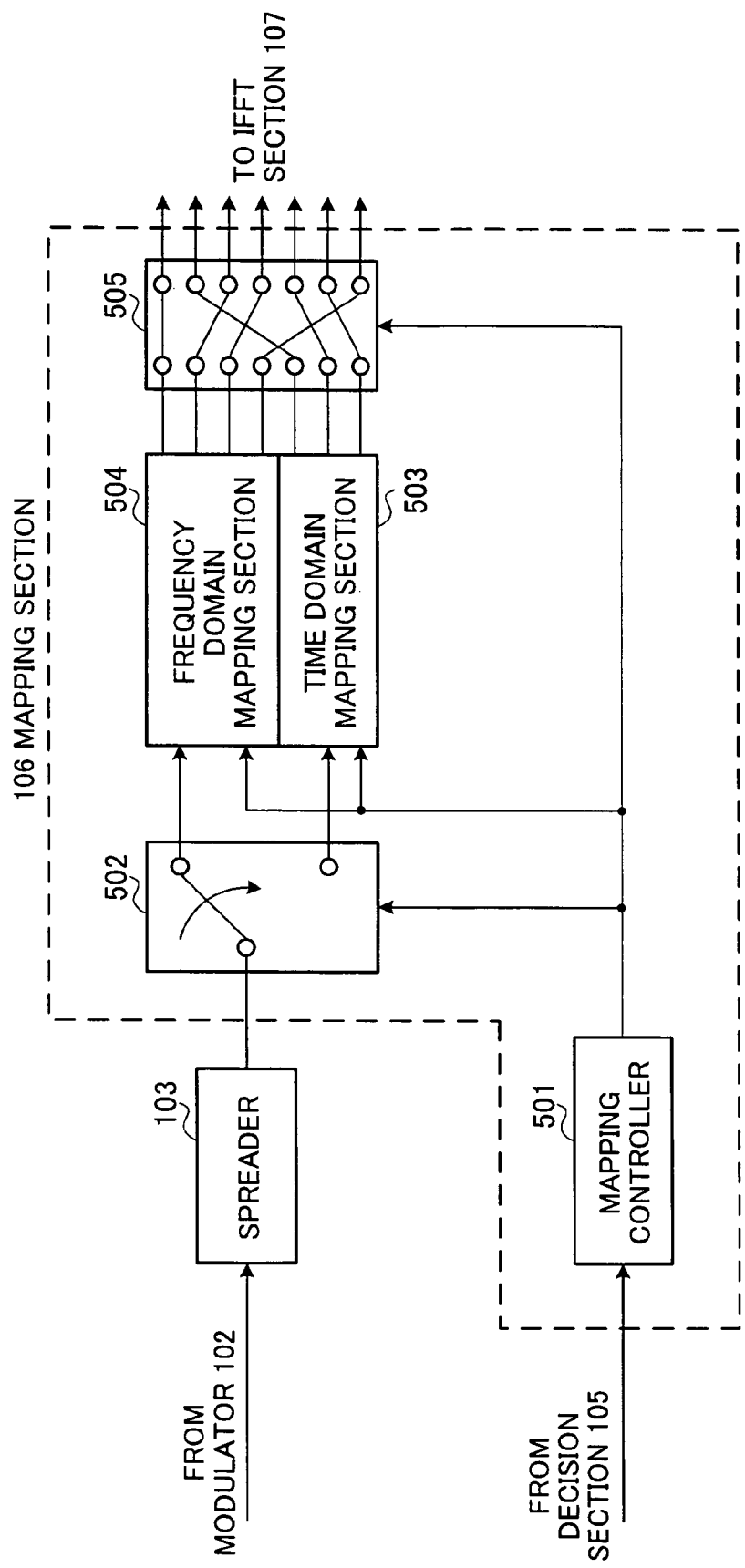
FIG. 5 is a block diagram showing an example of the configuration of the mapping section of the radio communication apparatus of the above described embodiment.

Next, details of mapping section 106 will be explained. FIG. 5 is a block diagram showing an example of the configuration of the mapping section of the radio communication apparatus of this embodiment. Mapping section 106 in FIG. 5 is principally comprised of mapping controller 501, switch 502, time domain mapping section 503, frequency domain mapping section 504 and switch 505.

In FIG. 5, mapping controller 501 controls switch 502 and switch 505 based on a decision result output from decision section 105.

First, mapping controller 501 outputs an instruction to switch 502 to output data to be mapped on subcarriers having propagation channel quality equal to or higher than a predetermined level from spreader 103 to time domain mapping section 503. Next, mapping controller 501 outputs an instruction to switch 502 to output data to be mapped on subcarriers having propagation channel quality lower than a predetermined level from spreader 103 to frequency domain mapping section 504.

Furthermore, mapping controller 501 outputs the number of subcarriers having propagation channel quality equal to or higher than a predetermined level to time domain mapping section 503 and outputs the number of subcarriers having propagation channel quality lower than a predetermined level to frequency domain mapping section 504. Furthermore, mapping controller 501 outputs frequencies of the subcarriers having propagation channel quality equal to or higher than a predetermined level and frequencies of the subcarriers having propagation channel quality lower than a predetermined level to switch 505.

Following the instruction of mapping controller 501, switch 502 outputs chips spread by spreader 103 to time domain mapping section 503 or frequency domain mapping section 504. Time domain mapping section 503 maps the chips on their respective subcarriers in the time domain and outputs them to switch 505. Frequency domain mapping section 504 maps the chips on their respective subcarriers in the frequency domain and outputs them to switch 505.

Switch 505 outputs the chips output from time domain mapping section 503 to subcarriers having propagation channel quality equal to or higher than a predetermined level and outputs the chips output from frequency domain mapping section 504 to subcarriers having propagation channel quality lower than a predetermined level.

Figure 6:
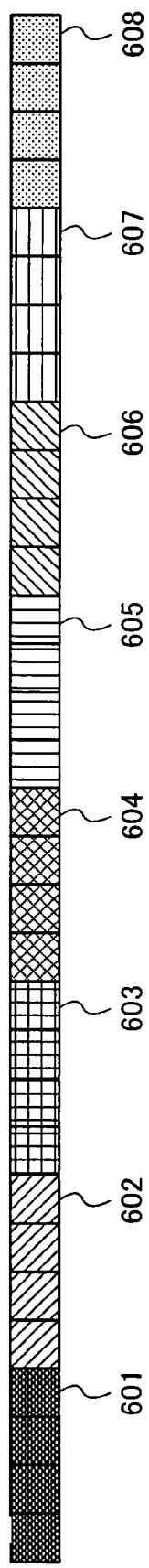
FIG. 6 illustrates an example of spread data.
Figure 7:
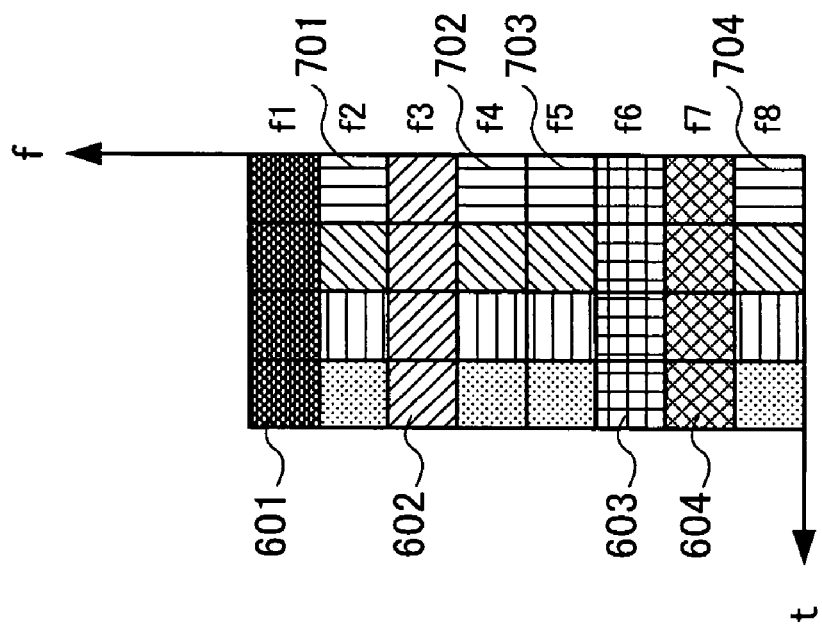
FIG. 7 illustrates an example of data mapped on subcarriers.

An example of mapping using the above described configuration will be explained below. FIG. 6 illustrates an example of spread data. FIG. 7 illustrates an example of data mapped on subcarriers. The data in FIG. 6 is spread at a spreading factor of 4 and one piece of data is spread on four chips. Furthermore, in FIG. 7, propagation channel quality of carrier frequency f1, f3, f6 and f7 is equal to or higher than a predetermined level, whereas propagation channel quality of carrier frequency f2, f4, f5 and f8 is lower than a predetermined level.

Data 601 is mapped to frequency f1 in FIG. 7. Next, data 602 is mapped to frequency f3 in FIG. 7, data 603 is mapped to frequency f6 in FIG. 7 and data 604 is mapped to frequency f7 in FIG. 7 in the time axis domain.

After data is mapped to carrier frequencies having propagation channel quality equal to or higher than a predetermined level in the time axis domain, data is mapped to carrier frequencies having propagation channel quality lower than a predetermined level in the frequency domain.

Data 605 is mapped to positions 701, 702, 703 and 704 of frequencies f2, f4, f5 and f8. Likewise, data 606, 607 and 608 are mapped to frequencies f2, f4, f5 and f8 in chip units.

Through the above described operation, radio communication apparatus 100 maps data to carrier frequencies having propagation channel quality equal to or higher than a predetermined level in the time axis domain and maps data to carrier frequencies having propagation channel quality lower than a predetermined level in the frequency domain.

Figure 8:
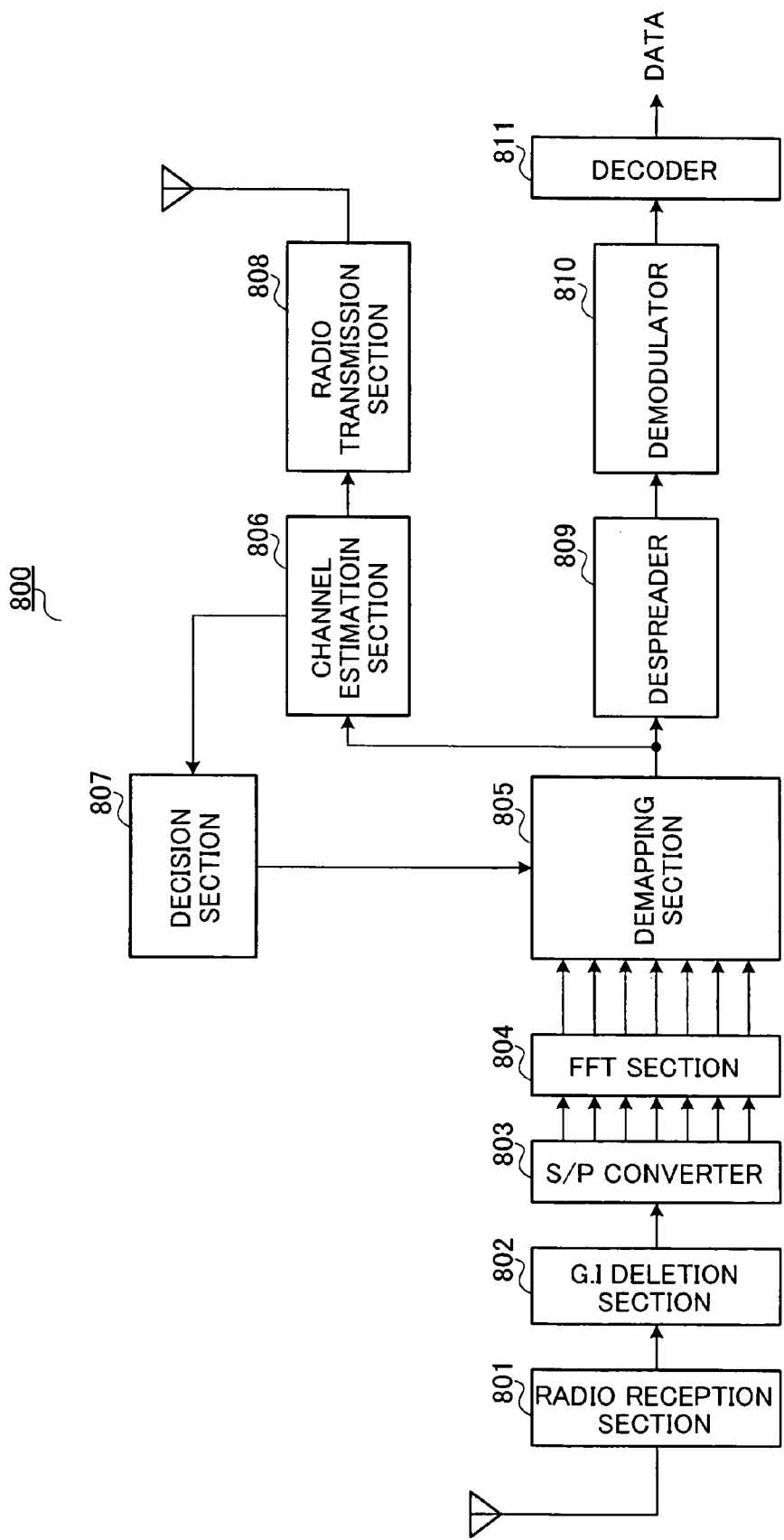
FIG. 8 is another block diagram showing the configuration of the radio communication apparatus according to Embodiment 1 of the present invention.

Next, an example where data transmitted by radio communication apparatus 100 is received will be explained. FIG. 8 is another block diagram showing the configuration of the radio communication apparatus according to Embodiment 1 of the present invention. The radio communication apparatus 800 in FIG. 8 is principally comprised of radio reception section 801, G.I deletion section 802, S/P converter 803, FFT section 804, demapping section 805, channel estimation section 806, decision section 807, radio transmission section 808, despreader 809, demodulator 810 and decoder 811.

In FIG. 8, radio reception section 801 receives a radio signal transmitted from radio communication apparatus 100, converts this radio signal to a signal with a baseband frequency, outputs the received signal obtained to G.I deletion section 802. G.I deletion section 802 removes a guard interval from the received signal and outputs it to S/P converter 803.

S/P converter 803 converts data from serial to parallel and outputs it to FFT section 804. FFT section 804 subjects the received signals to a fast Fourier transform and outputs the transformed received signals to demapping section 805.

Following the decision result of decision section 807, demapping section 805 unites chips mapped in the time axis domain of received signals of subcarriers having propagation channel quality equal to or higher than a predetermined level into one piece of data and unites chips mapped in the frequency axis domain of received signals of subcarriers having propagation channel quality lower than a predetermined level into one piece of data.

Demapping section 805 then outputs the remapped data to despreader 809. Furthermore, demapping section 805 outputs the received signals of the respective subcarriers to channel estimation section 806.

Channel estimation section 806 estimates a propagation channel environment for each subcarrier and outputs the estimation results to decision section 807 and radio transmission section 808. For example, channel estimation section 806 measures reception quality of a pilot signal inserted for each subcarrier and estimates a propagation channel environment for each subcarrier from this reception quality.

Decision section 807 decides whether propagation channel quality is equal to or higher or lower than a predetermined level for each subcarrier and outputs the decision results to demapping section 805. Decision section 807 makes such decisions based on the same reference as that of decision section 105 of radio communication apparatus 100, and therefore, it is possible to allow mapping section 106 of radio communication apparatus 100 and demapping section 805 of radio communication apparatus 800 to have the same subcarriers on which data chip components are mapped in the time domain and the same subcarriers on which data chip components are mapped in the frequency domain.

Radio transmission section 808 modulates information about the estimated propagation channel quality and converts it to a radio frequency and transmits the signal as a radio signal to radio communication apparatus 100. Despreader 809 despreads the remapped received data by multiplying the received data by a spreading code and outputs the despread data to demodulator 810. Demodulator 810 demodulates the received data and outputs the demodulated data to decoder 811. Decoder 811 decodes the received data.

Figure 9:
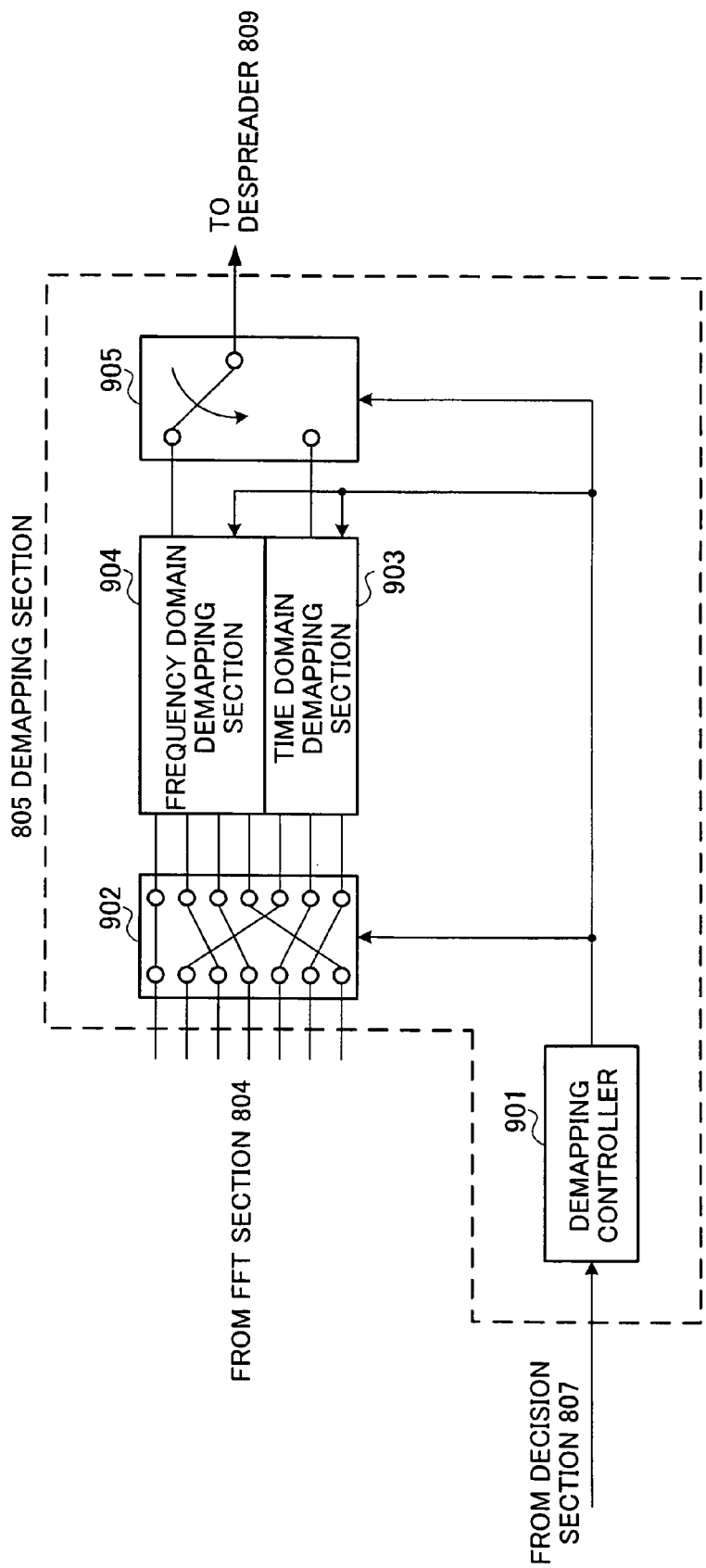
FIG. 9 is a block diagram showing an example of the configuration of a demapping section of the radio communication apparatus of the above described embodiment.

Next, details of demapping section 805 will be explained. FIG. 9 is a block diagram showing an example of the configuration of the demapping section of the radio communication apparatus of this embodiment. Demapping section 805 in FIG. 9 is principally constructed of demapping controller 901, switch 902, time domain demapping section 903, frequency domain demapping section 904 and switch 905.

Demapping controller 901 controls switch 902 and switch 905 based on the decision result output from decision section 807. Furthermore, demapping controller 901 outputs the frequencies of subcarriers having propagation channel quality equal to or higher than a predetermined level and the frequencies of subcarriers having propagation channel quality lower than a predetermined level to switch 902.

Demapping controller 901 outputs the number of subcarriers having propagation channel quality equal to or higher than a predetermined level to time domain demapping section 903 and outputs the number of subcarriers having propagation channel quality lower than a predetermined level to frequency domain demapping section 904.

Switch 902 outputs the received signals transmitted with subcarriers having propagation channel quality equal to or higher than a predetermined level to time domain demapping section 903 and outputs the received signals transmitted with subcarriers having propagation channel quality lower than a predetermined level to frequency domain demapping section 904.

Time domain demapping section 903 unites chips mapped on their respective subcarriers in the time domain into one piece of data and output the data to switch 905. Frequency domain demapping section 904 unites chips mapped on their respective subcarriers in the frequency domain into one piece of data and output the data to switch 905.

Switch 905 outputs the received data output from time domain demapping section 903 to despreader 809 and then outputs the received data output from frequency domain demapping section 904 to despreader 809.

Thus, in an OFDM-CDMA communication, the radio communication apparatus of this embodiment maps chips on subcarriers having a propagation channel environment better than a predetermined level in the time axis domain and chips on subcarriers having a propagation channel environment worse than a predetermined level in the frequency domain, and therefore, it is possible to achieve the effect of maintaining orthogonality among spreading codes when chips are spread in the time domain and the frequency diversity effect when chips are spread in the frequency domain.

In the above described embodiment, chips with spread data are mapped in the frequency domain for subcarriers in a bad propagation channel environment, but these chips may also be mapped two-dimensionally, in the frequency domain and time axis domain. An example where chips are mapped two-dimensionally will be explained below.

Figure 10:
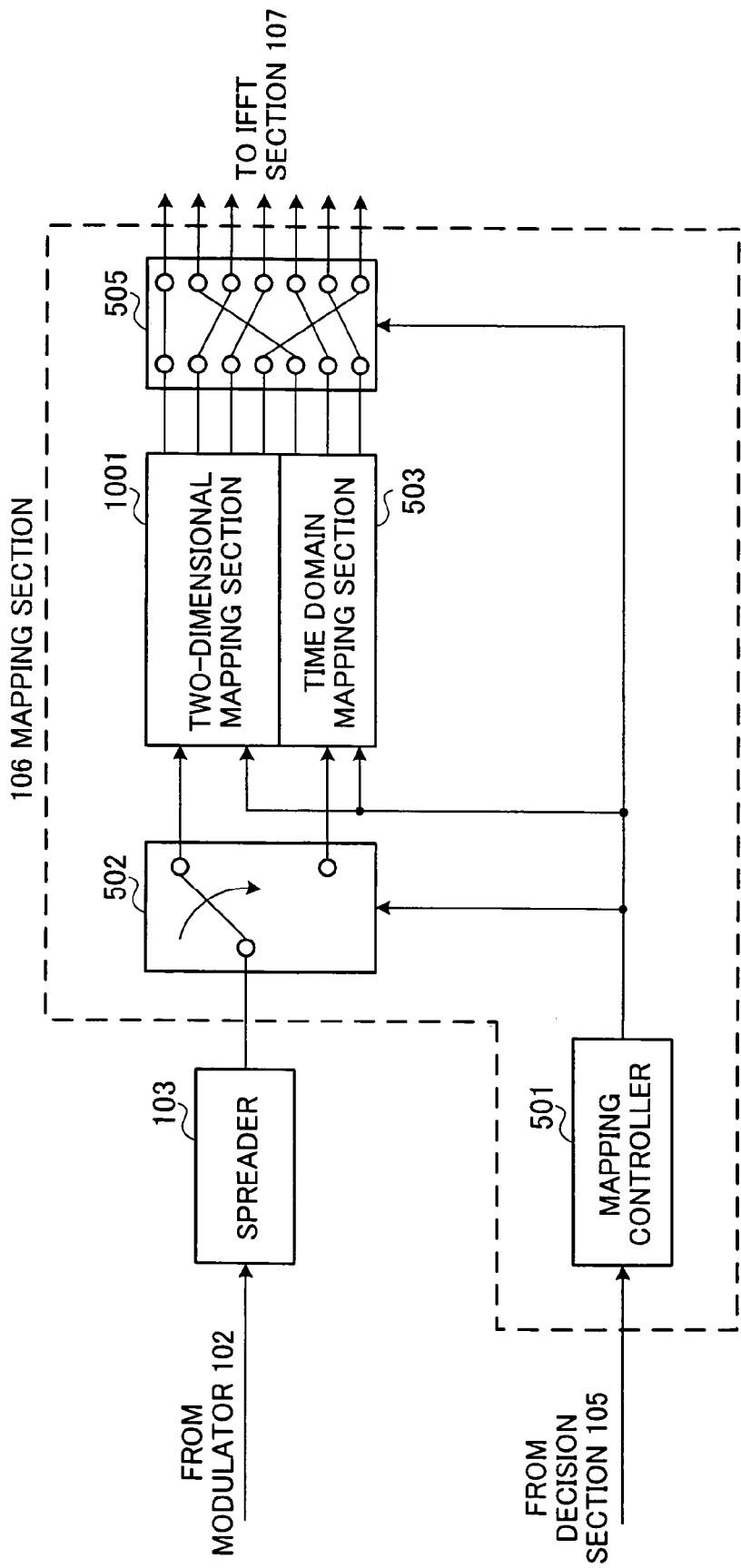
FIG. 10 is a block diagram showing an example of the configuration of the mapping section of the radio communication apparatus in the above described embodiment.

FIG. 10 is a block diagram showing an example of the configuration of the mapping section of the radio communication apparatus in this embodiment. However, the same components as those in FIG. 5 are assigned the same reference numerals as those in FIG. 5 and detailed explanations thereof will be omitted.

The mapping section 106 in FIG. 10 is provided with two-dimensional mapping section 1001 instead of frequency domain mapping section 504. Two-dimensional mapping section 1001 maps chips with spread data on subcarriers in a bad propagation channel environment two-dimensionally, in the frequency domain and time axis domain, and outputs the chips to switch 505.

Figure 11:
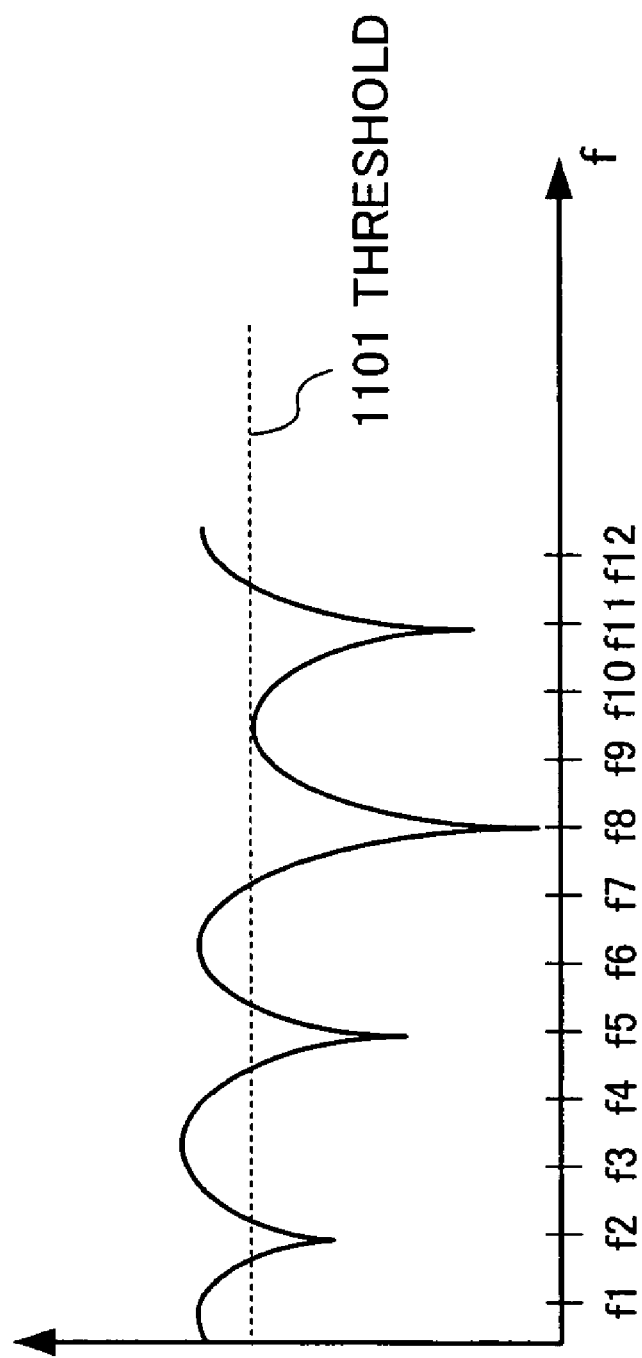
FIG. 11 illustrates an example of channel variation in the frequency domain.

FIG. 11 illustrates an example of channel variation in the frequency domain. In FIG. 11, the vertical axis shows a reception level and the horizontal axis shows a frequency. Furthermore, f1 to f12 indicate subcarrier frequencies. In FIG. 11, signals of f2, f5, f8, f9, f10 and f11 have very low reception levels due to frequency selective fading. Signals of f1, f3, f4, f6, f7 and f12 have reception levels higher than threshold 1101.

Figure 12:
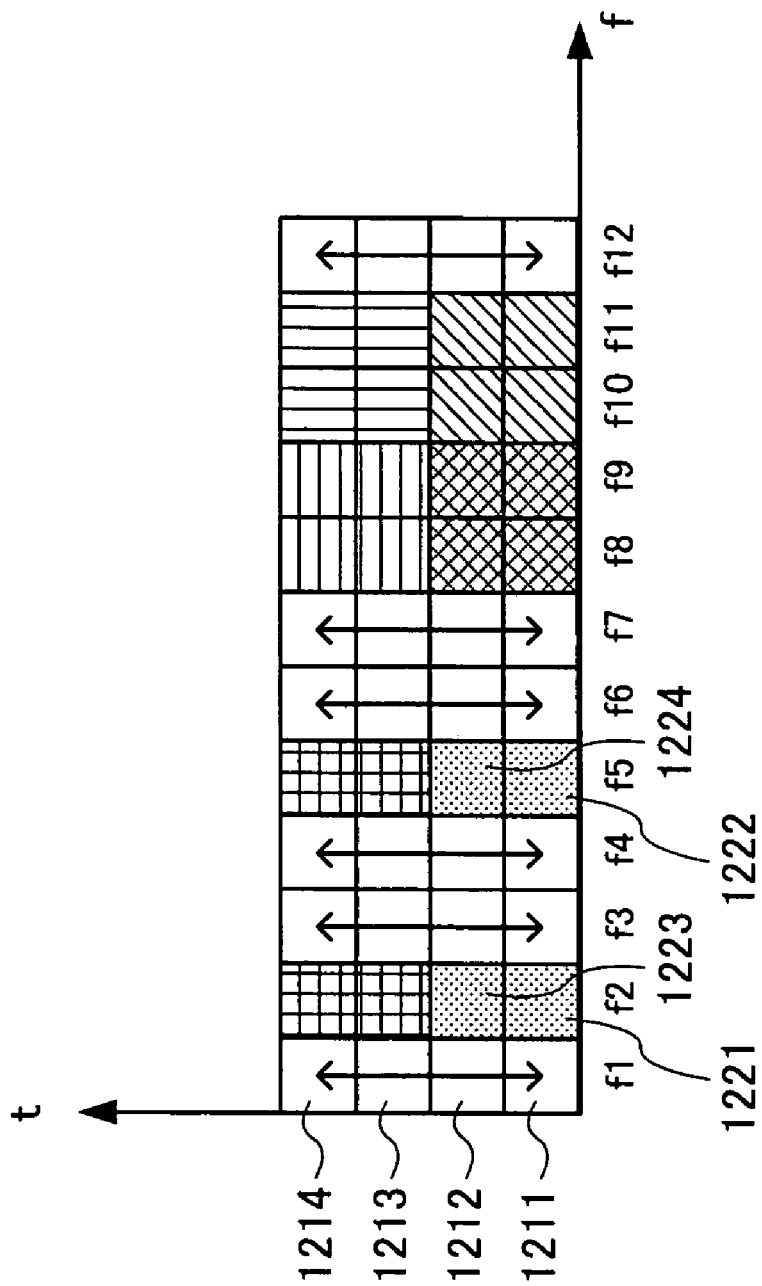
FIG. 12 illustrates an example of chip arrangement of the radio communication apparatus of the above described embodiment.

FIG. 12 illustrates an example of chip arrangement of the radio communication apparatus of this embodiment. In FIG. 12, the vertical axis shows a time and the horizontal axis shows a frequency. Furthermore, frequencies f1 to f12 in FIG. 12 correspond to frequencies f1 to f12 in FIG. 11.

Radio communication apparatus 100 maps chips with spread data on subcarriers of frequencies f1, f3, f4, f6, f7 and f12 having reception levels equal to or higher than a predetermined level in the time domain. For example, chips obtained by spreading transmission data are mapped at positions 1211, 1212, 1213 and 1214.

Radio communication apparatus 100 then maps chips with spread data on subcarriers having frequencies of f2, f5, f8, f9, f10 and f11 having reception levels lower than a predetermined level two-dimensionally, in the frequency domain and time axis domain. For example, chips obtained by spreading transmission data are mapped at positions 1221, 1222, 1223 and 1224.

Figure 13:
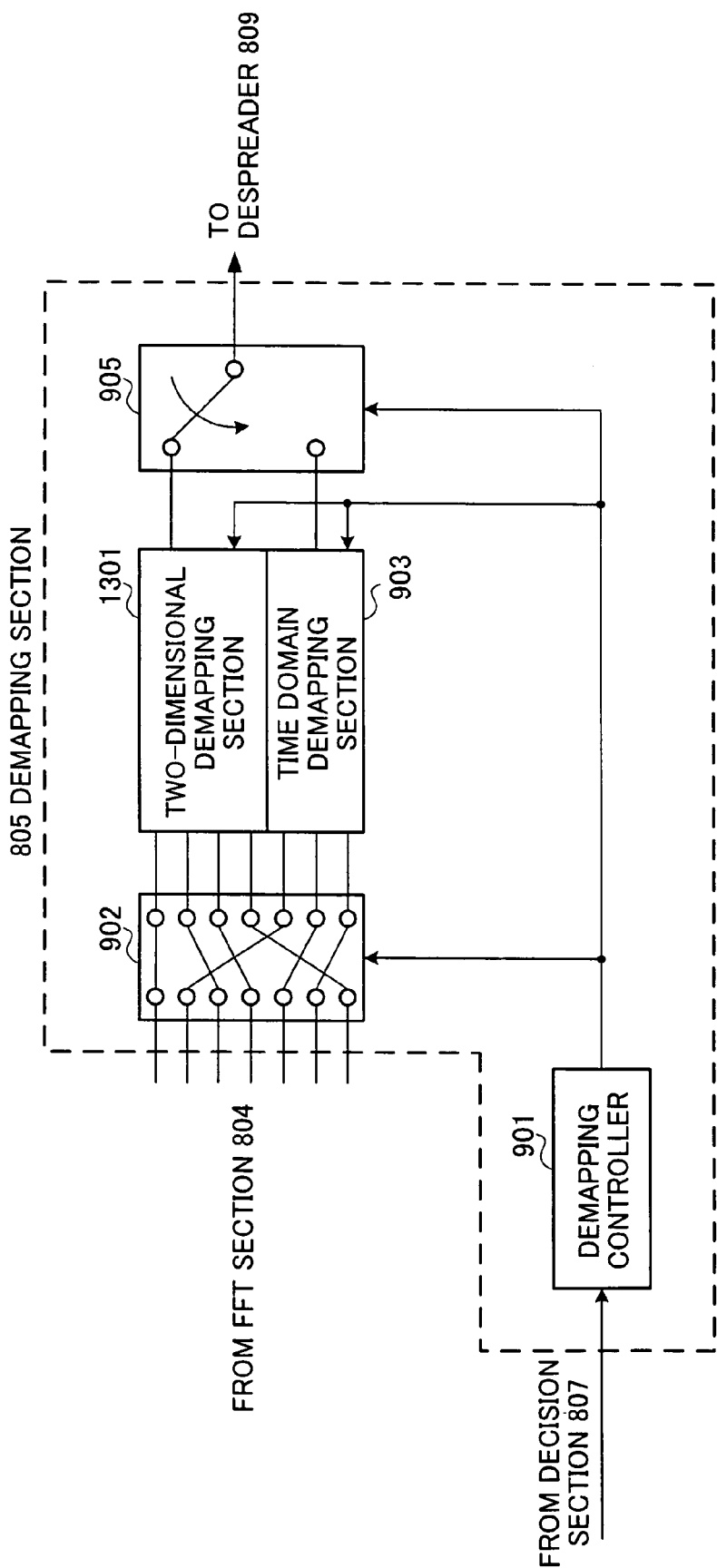
FIG. 13 is a block diagram showing an example of the configuration of the demapping section of the radio communication apparatus of the above described embodiment.

FIG. 13 is a block diagram showing an example of the configuration of the demapping section of the radio communication apparatus of this embodiment. However, the same components as those in FIG. 9 are assigned the same reference numerals as those in FIG. 9 and detailed explanations thereof will be omitted.

Demapping section 805 in FIG. 13 is provided with two-dimensional demapping section 1301 instead of frequency domain demapping section 904. Two-dimensional demapping section 1301 unites chips mapped on subcarriers in a bad propagation channel environment two-dimensionally, in the frequency domain and time axis domain, into one piece of data and outputs the data to switch 905.

Thus, for subcarriers in a bad propagation channel environment, chips with spread data are mapped two-dimensionally, in the frequency domain and time axis domain.

Furthermore, according to the above described explanation, channel estimated values based on the received data of the corresponding frame are used as the input of the decision section for channel estimation section 806 and decision section 807 on the receiver side, but when, for example, FDD is used, it is possible to save channel estimated values of the preceding frame (decision section input on the transmitting side of the frame) and perform demapping based on this.

Furthermore, in the case of a TDD scheme, it is also possible to use a method whereby the radio communication apparatuses on the transmitting side and receiving side perform channel estimation based on their received signals respectively and do not send any channel estimated values to the other communication party.

Embodiment 2

Figure 14:
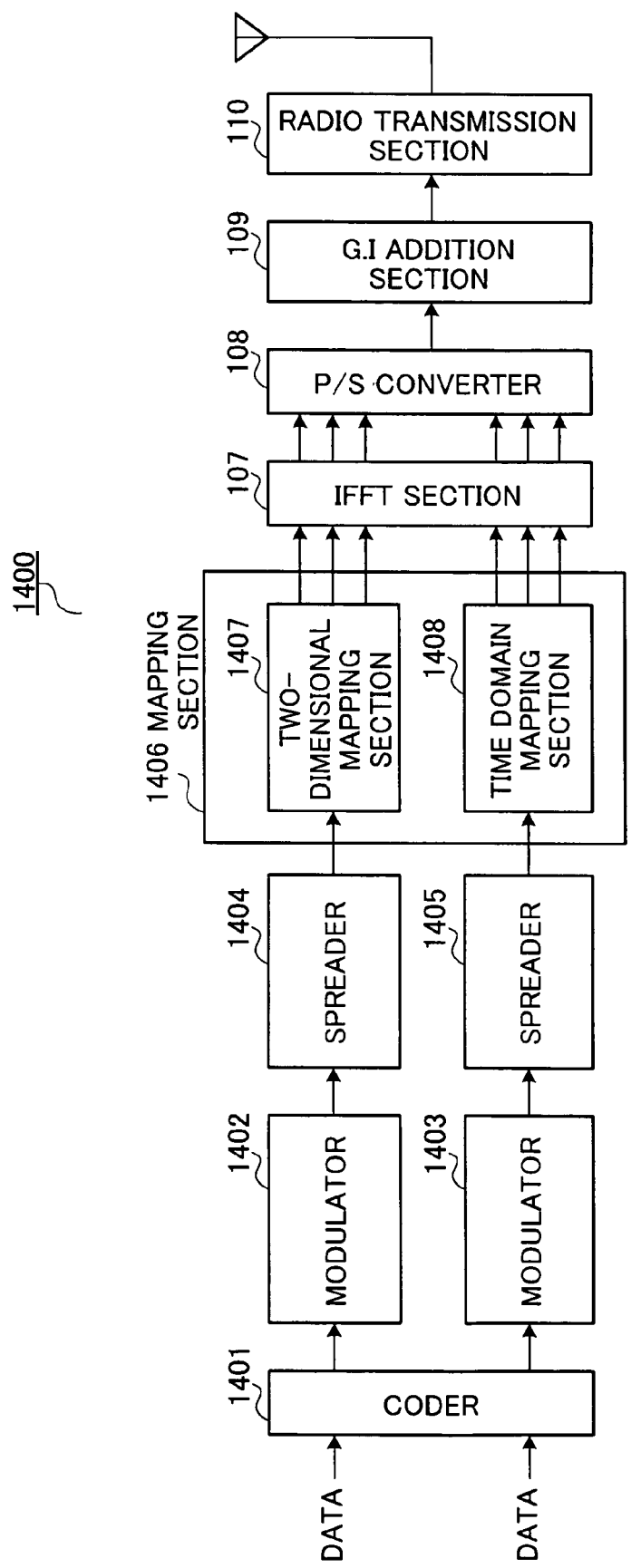
FIG. 14 is a block diagram showing the configuration of a radio communication apparatus according to Embodiment 2 of the present invention.

FIG. 14 is a block diagram showing the configuration of a radio communication apparatus according to Embodiment 2 of the present invention. However, the same components as those in FIG. 1 are assigned the same reference numerals as those in FIG. 1 and detailed explanations thereof will be omitted.

The radio communication apparatus 1400 in FIG. 14 is provided with coder 1401, modulator 1402, modulator 1403, spreader 1404, spreader 1405 and mapping section 1406, and is different from FIG. 1 in that it maps chips on subcarriers for information bits two-dimensionally, in the frequency domain and time domain, and maps chips on subcarriers for parity bits in the time domain. Mapping section 1406 is comprised of two-dimensional mapping section 1407 and time domain mapping section 1408.

In FIG. 14, coder 1401 codes data transmitted, outputs information bits of the data to modulator 1402 and outputs parity bits to modulator 1403. Modulator 1402 modulates the information bits and outputs the modulated information bits to spreader 1404. Modulator 1403 outputs the parity bits and outputs the modulated parity bits to spreader 1405.

Spreader 1404 multiplies the information bits by a spreading code and outputs the multiplication result to two-dimensional mapping section 1407. Spreader 1405 multiplies the parity bits by a spreading code and outputs the multiplication result to time domain mapping section 1408.

Two-dimensional mapping section 1407 maps the chips of the information bits on subcarriers two-dimensionally, in the frequency domain and time axis domain, and outputs the chips to IFFT section 107. Time domain mapping section 1408 maps chips of the parity bits on subcarriers in the time domain and outputs the chips to IFFT section 107.

Figure 15:
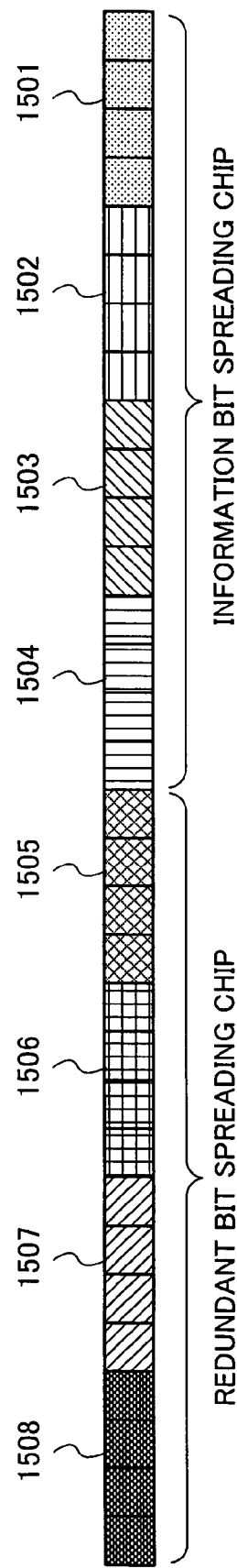
FIG. 15 illustrates an example of spread data.

Next, mapping of the radio communication apparatus 1400 of this embodiment will be explained. FIG. 15 illustrates an example of spread data. In the case of the data in FIG. 15, one piece of data is spread into four chips at a spreading factor of 4. Furthermore, in FIG. 15, data is coded at a coding rate of ½, the information bit consists of four bits 1501 to 1504 and the parity bit consists of four bits 1505 to 1508.

Figure 16:
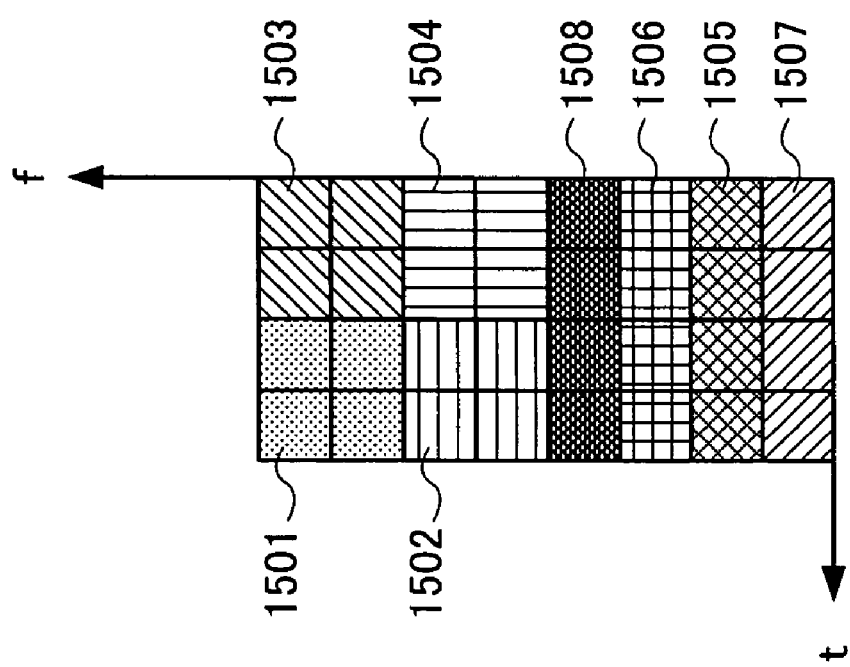
FIG. 16 illustrates an example of data mapped on subcarriers.

FIG. 16 illustrates an example of data mapped on subcarriers. In FIG. 16, the vertical axis shows a frequency and the horizontal axis shows a time. In FIG. 16, radio communication apparatus 1400 maps information bits 1501 to 1504 two-dimensionally, 2 chips in the frequency domain and 2 chips in the time domain. Furthermore, radio communication apparatus 1400 maps parity bits 1505 to 1508 in the time domain.

Figure 17:
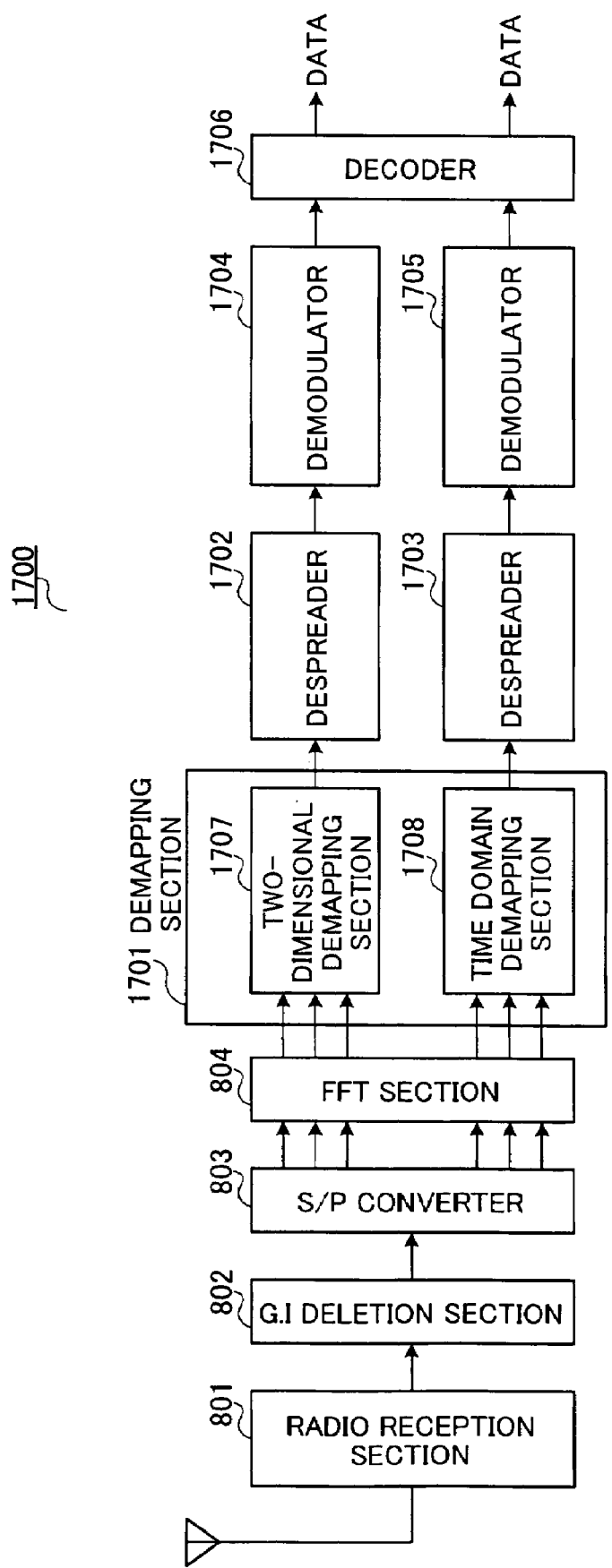
FIG. 17 is a block diagram showing the configuration of a radio communication apparatus according to Embodiment 2 of the present invention.

Next, the radio communication apparatus that receives data transmitted from radio communication apparatus 1400 will be explained. FIG. 17 is another block diagram showing the configuration of the radio communication apparatus according to Embodiment 2 of the present invention. However, the same components as those in FIG. 8 are assigned the same reference numerals as those in FIG. 8 and detailed explanations thereof will be omitted.

Radio communication apparatus 1700 in FIG. 17 is provided with demapping section 1701, despreader 1702, despreader 1703, demodulator 1704, demodulator 1705 and decoder 1706, and is different from the radio communication apparatus in FIG. 8 in that it unites chips mapped on subcarriers for information bits two-dimensionally, in the frequency domain and time domain, into one information bit, and unites chips mapped on subcarriers for parity bits in the time domain into one parity bit. Demapping section 1701 is constructed of two-dimensional demapping section 1707 and time domain demapping section 1708.

FFT section 804 applies a fast Fourier transform to a received signal and outputs the transformed received signal to two-dimensional demapping section 1707 and time domain demapping section 1708.

Two-dimensional demapping section 1707 unites chips mapped on respective subcarriers two-dimensionally, in the frequency domain and time domain, into one information bit and outputs the information bit to despreader 1702. Time domain demapping section 1708 unites chips mapped on respective subcarriers in the frequency domain into one parity bit and outputs the parity bit to despreader 1703.

Despreader 1702 despreads the remapped information bit by multiplying it by a spreading code and outputs the spread information bit to demodulator 1704. Despreader 1703 despreads the remapped parity bit by multiplying it by a spreading code and outputs the spread parity bit to demodulator 1705.

Demodulator 1704 demodulates the information bit and outputs the demodulated bit to decoder 1706. Demodulator 1705 demodulates the parity bit and outputs the demodulated parity bit to decoder 1706. Decoder 1706 decodes data from the information bit and parity bit.

Thus, in an OFDM-CDMA communication, the radio communication apparatus of this embodiment maps chips of information bits on subcarriers two-dimensionally, in the frequency domain and time domain, and maps chips of parity bits on subcarriers in the time domain, and therefore, it is possible to prevent the levels of information bits from deteriorating extremely, maintain orthogonality of parity bits and make the most of characteristics of the respective bits necessary for error correction.

According to the above described explanations, subcarriers for time domain spreading and for two-dimensional spreading are completely separated, but there may also be subcarriers to which both spreading methods are applied.

Embodiment 3

Figure 18:
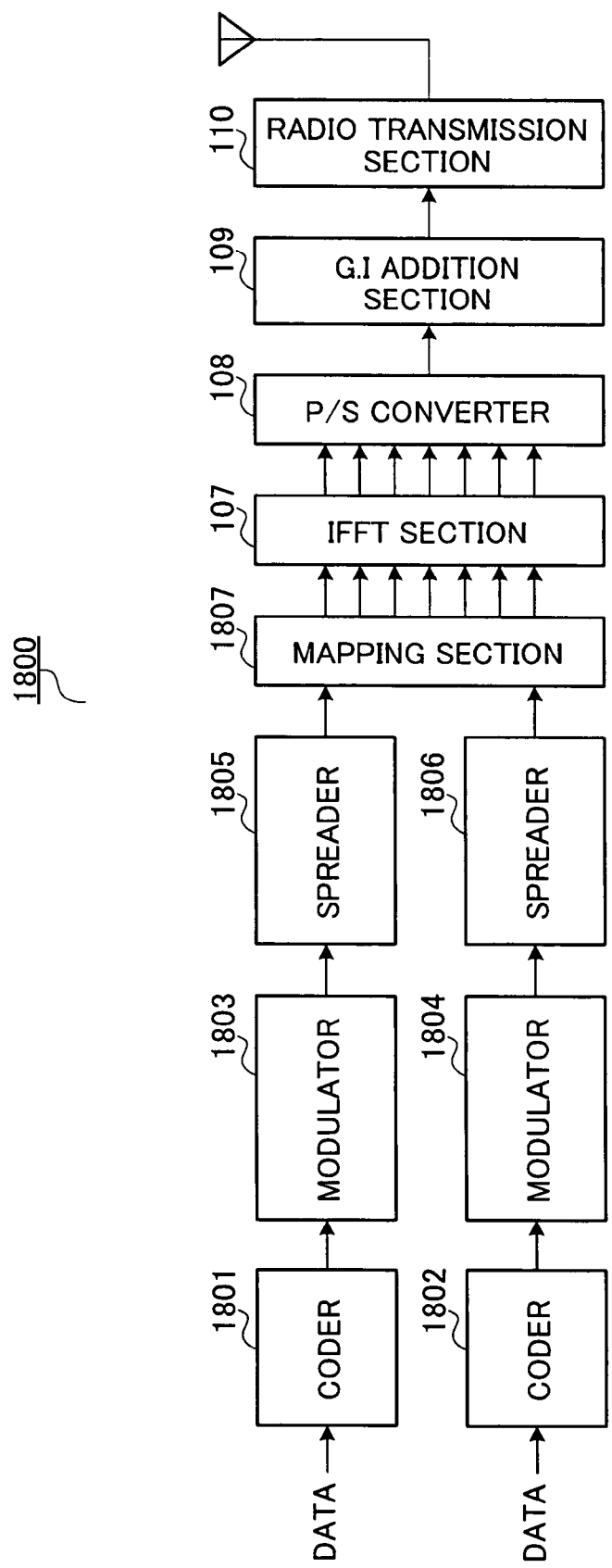
FIG. 18 is a block diagram showing the configuration of a radio communication apparatus according to Embodiment 3 of the present invention.

FIG. 18 is a block diagram showing the configuration of a radio communication apparatus according to Embodiment 3 of the present invention. However, the same components as those in FIG. 1 are assigned the same reference numerals as those in FIG. 1 and detailed explanations thereof will be omitted.

Radio communication apparatus 1800 in FIG. 18 is provided with coder 1801, coder 1802, modulator 1803, modulator 1804, spreader 1805, spreader 1806 and mapping section 1807, and is different from the radio communication apparatus in FIG. 1 in that when data coded at a plurality of different coding rates are transmitted, for data coded at a high coding rate, chips with spread data are mapped on subcarriers two-dimensionally, in the frequency domain and time domain and for data coded at a low coding rate, chips with spread data are mapped on subcarriers in the time domain.

Coder 1801 codes data to be transmitted and outputs the coded data to modulator 1803. Coder 1802 codes data to be transmitted at a coding rate lower than that of coder 1801 and outputs the coded data to modulator 1804.

Modulator 1803 modulates the data and outputs the modulated data to spreader 1805. Modulator 1804 modulates the data and outputs the modulated data to spreader 1806.

Spreader 1805 multiplies the data by a spreading code and outputs the multiplication result to mapping section 1807. Spreader 1806 multiplies the data by a spreading code and outputs the multiplication result to mapping section 1807.

For the data output from spreader 1805, that is to say, data subjected to coding processing at a high coding rate, mapping section 1807 maps chips with spread data on subcarriers two-dimensionally, in the frequency domain and time domain. Furthermore, for data output from spreader 1806, that is to say, data subjected to coding processing at a low coding rate, mapping section 1807 maps chips with spread data on subcarriers in the time domain. Mapping section 1807 then outputs the data with chips mapped on subcarriers to IFFT section 107.

Figure 19:
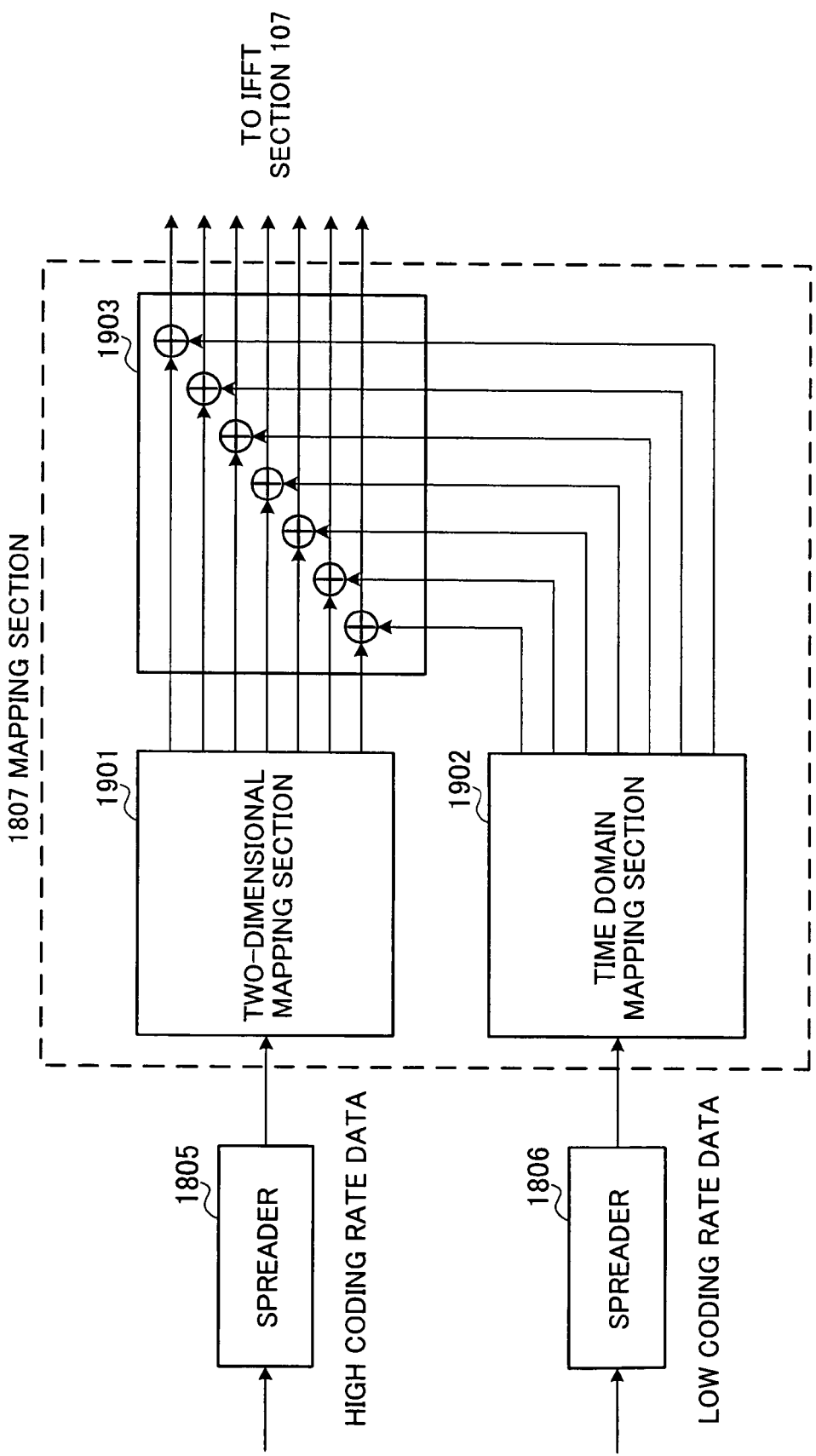
FIG. 19 is a block diagram showing an example of the configuration of the mapping section of the radio communication apparatus of this embodiment.

Next, details of mapping section 1807 will be explained. FIG. 19 is a block diagram showing an example of the configuration of the mapping section of the radio communication apparatus of this embodiment.

Mapping section 1807 in FIG. 19 is principally constructed of two-dimensional mapping section 1901, time domain mapping section 1902 and adder 1903.

For data coded at a high coding rate, two-dimensional mapping section 1901 maps chips with spread data on subcarriers two-dimensionally, in the frequency domain and time axis domain, and outputs the chips to adder 1903. For data coded at a low coding rate, time domain mapping section 1902 maps chips with spread data on subcarriers in the time domain and outputs the chips to adder 1903.

Adder 1903 adds up the data output from two-dimensional mapping section 1901 and data output from time domain mapping section 1902 for each subcarrier and outputs the addition result to IFFT section 107.

Figure 20:
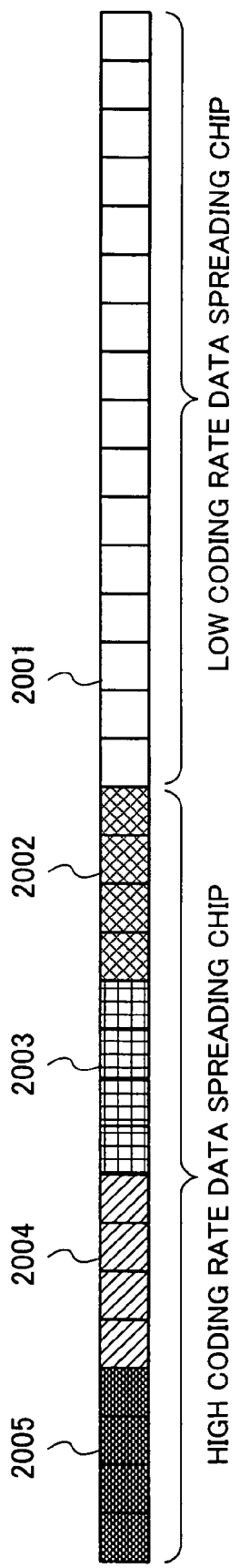
FIG. 20 illustrates an example of spread data.
Figure 21:
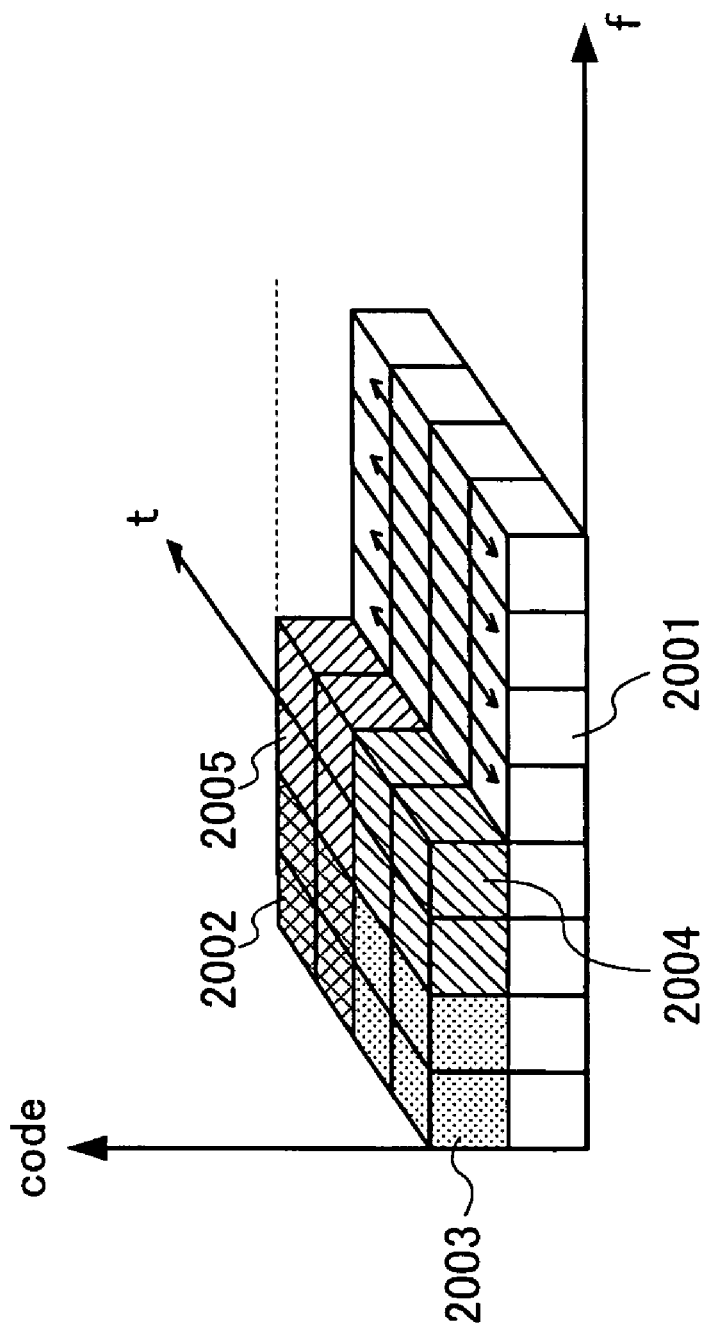
FIG. 21 illustrates an example of data mapped on subcarriers.

FIG. 20 illustrates an example of spread data. The data in FIG. 20 comprises of data 2001 coded at a low coding rate, data 2002 to 2005 coded at coding rates higher than that of data 2001. FIG. 21 illustrates an example of data mapped on subcarriers. In FIG. 21, the vertical axis shows code multiplexing and the horizontal axis shows a frequency. Furthermore, the axis in the diagonal rightward domain shows a time.

For low coding rate data 2001, chips are mapped on subcarriers in the time domain and for high coding rate data 2002 to 2005, chips are mapped on subcarriers two-dimensionally, in the frequency domain and time domain.

Figure 22:
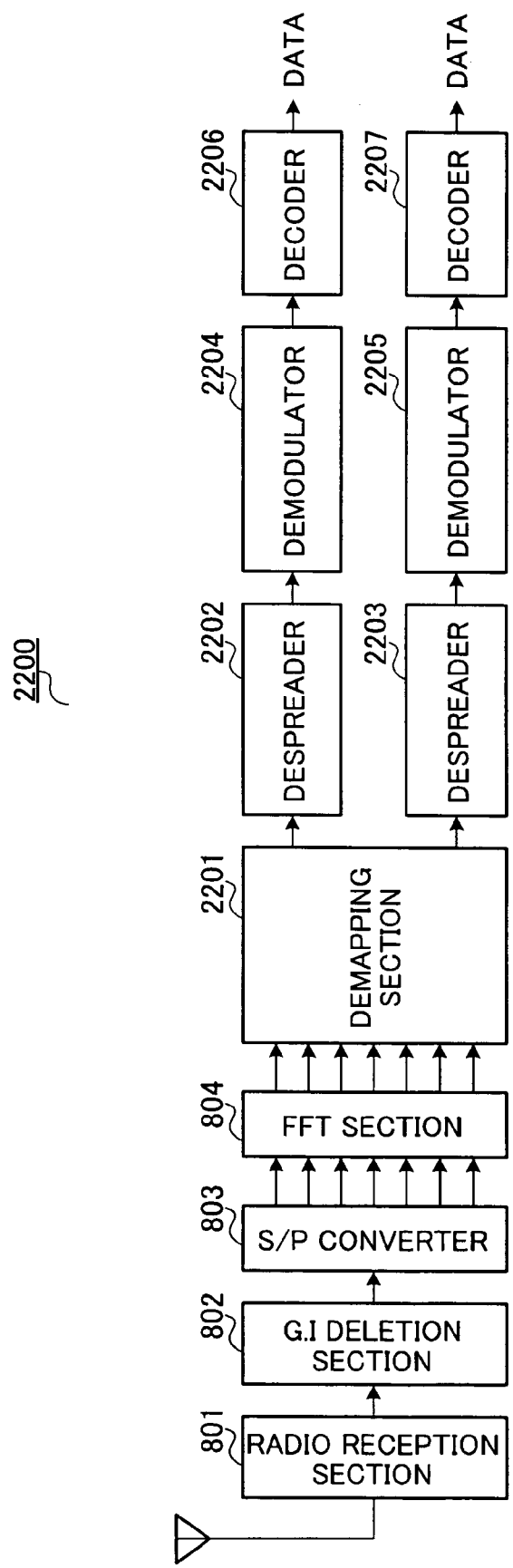
FIG. 22 is another block diagram showing the configuration of the radio communication apparatus according to Embodiment 3 of the present invention.

Next, the radio communication apparatus that receives data transmitted from radio communication apparatus 1800 will be explained. FIG. 22 is another block diagram showing the configuration of the radio communication apparatus according to Embodiment 3 of the present invention. However, the same components as those in FIG. 8 are assigned the same reference numerals as those in FIG. 8 and detailed explanations thereof will be omitted.

In FIG. 22, radio communication apparatus 2200 is provided with demapping section 2201, despreader 2202, despreader 2203, demodulator 2204, demodulator 2205, decoder 2206 and decoder 2207, and is different from the radio communication apparatus in FIG. 8 in that for data coded at a high coding rate, it unites chips mapped on subcarriers two-dimensionally, in the frequency domain and time domain, into one information bit, and for data coded at a low coding rate, it unites chips mapped on subcarriers in the time domain into one parity bit.

In FIG. 22, FFT section 804 applies a fast Fourier transform to a received signal and outputs the transformed received signal to demapping section 2201.

Demapping section 2201 unites chips mapped on respective subcarriers two-dimensionally, in the frequency domain and time domain, into one information bit, outputs the information bit to despreader 2202 and unites chips mapped on respective subcarriers in the time domain into one parity bit and outputs the parity bit to despreader 2203.

Despreader 2202 multiplies the remapped data by a spreading code and outputs the multiplication result to demodulator 2204. Despreader 2203 multiplies the remapped data by a spreading code and outputs the multiplication result to demodulator 2205.

Demodulator 2204 demodulates the data and outputs it to decoder 2206. Demodulator 2205 demodulates the data and outputs it to decoder 2207.

Decoder 2206 and decoder 2207 decode the data. The coding rate for the data processed by decoder 2206 corresponds to coder 1801 and the coding rate for the data processed by decoder 2207 corresponds to coder 1802. That is, the coding rate for the data processed by decoder 2206 is higher than the coding rate for the data processed by decoder 2207.

Figure 23:
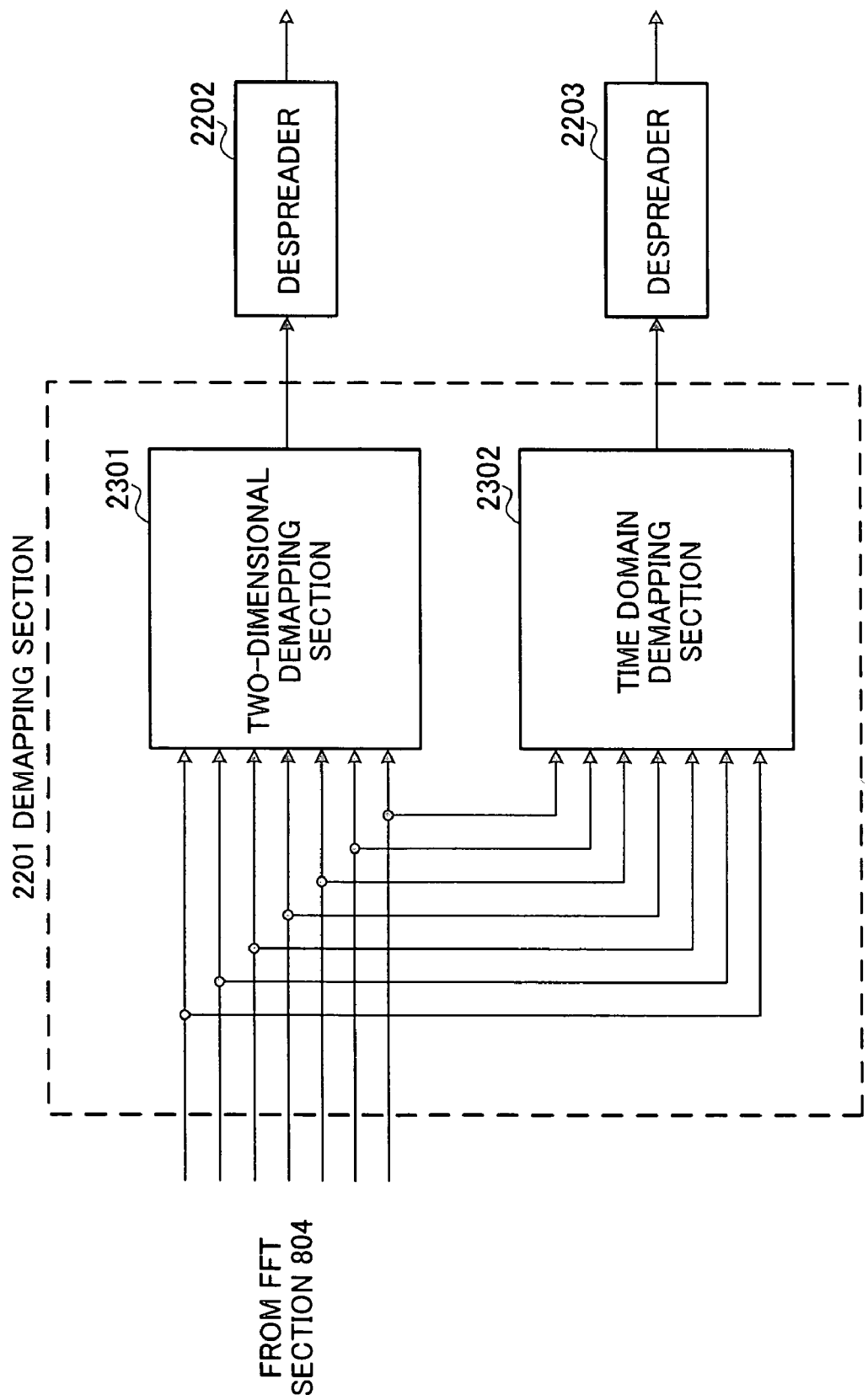
FIG. 23 is block diagram showing an example of the configuration of a demapping section of the radio communication apparatus of the above described embodiment.

Next, details of demapping section 2201 will be explained. FIG. 23 is a block diagram showing an example of the configuration of a demapping section of the radio communication apparatus of this embodiment.

Demapping section 2201 in FIG. 23 is principally comprised of two-dimensional demapping section 2301 and time domain demapping section 2302.

For data coded at a high coding rate, two-dimensional demapping section 2301 unites chips mapped on respective subcarriers two-dimensionally, in the frequency domain and time domain, into one information bit and outputs the information bit to despreader 2202. For data coded at a low coding rate, time domain demapping section 2302 unites chips mapped on respective subcarriers in the time domain into one parity bit and outputs the parity bit to despreader 2203.

Thus, when data is transmitted coded at a plurality of different coding rates, the radio communication apparatus according to this embodiment maps chips with spread data on subcarriers two-dimensionally, in the frequency domain and time domain for data coded at a high coding rate, and maps chips with spread data on subcarriers in the time domain for data coded at a low coding rate, and therefore, it is possible to prevent bits of extremely low reception quality from being produced for data coded at a high coding rate and prevent fewer parity bits from being received incorrectly and prevent error correction from being performed incorrectly.

According to the above described explanations, the coding rate is classified into two types, but it is also possible to mix three or more types of coding rate. For example, for data coded at a predetermined coding rate or higher, it is possible to arrange chips with spread data on subcarriers two-dimensionally, in the frequency domain and time domain, and for data coded at a coding rate lower than a predetermined spreading code, it is possible to arrange chips with spread data on subcarriers in the time domain.

Furthermore, the above described explanations describe an example where the spreading factor is 4, but there is no limitation to the spreading factor and the present invention is applicable to any spreading factor.

Embodiment 4

Figure 24:
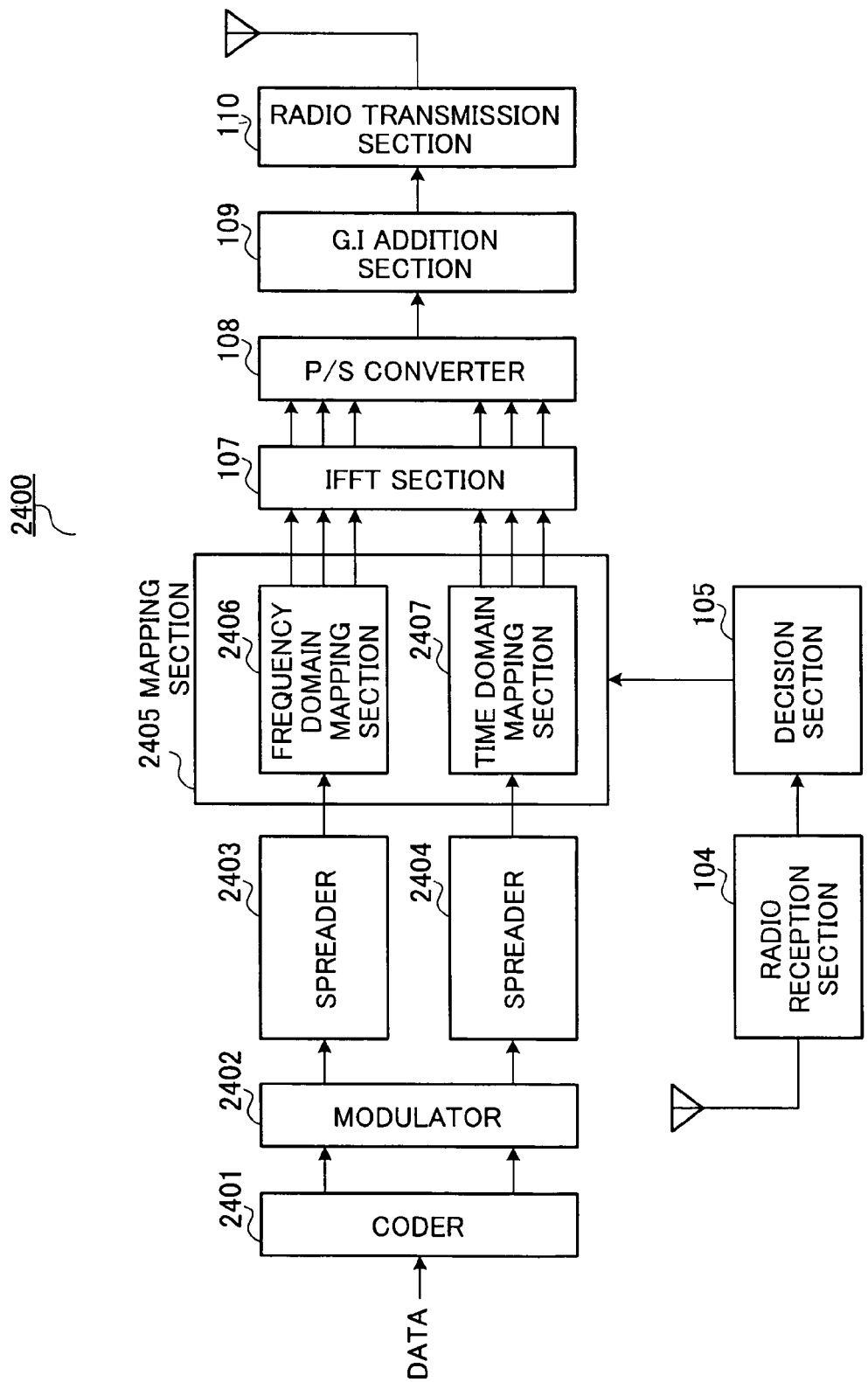
FIG. 24 is a block diagram showing the configuration of a radio communication apparatus according to Embodiment 4 of the present invention.

FIG. 24 is a block diagram showing the configuration of a radio communication apparatus according to Embodiment 4 of the present invention. However, the same components as those in FIG. 1 are assigned the same reference numerals as those in FIG. 1 and detailed explanations thereof will be omitted.

Radio communication apparatus 2400 in FIG. 24 is provided with coder 2401, modulator 2402, spreader 2403, spreader 2404 and mapping section 2405, and is different from the radio communication apparatus in FIG. 1 in that symbols spread in the frequency axis domain are spread at a higher spreading factor than that of symbols spread in the time axis domain. Furthermore, mapping section 2405 is principally constructed of frequency domain mapping section 2406 and time domain mapping section 2407.

Coder 2401 codes data to be transmitted and outputs the coded data to modulator 2402. Modulator 2402 modulates the data and outputs part of the modulated data to spreader 2403 and outputs the other part of the data to spreader 2404.

Spreader 2403 spreads data and output the spread data to frequency domain mapping section 2406 in mapping section 2405. Spreader 2404 spreads data at a spreading factor lower than that of spreader 2403 and outputs the spread data to time domain mapping section 2407 in mapping section 2405.

Frequency domain mapping section 2406 maps chips with spread data on subcarriers in the frequency domain and outputs the data with chips mapped on subcarriers to IFFT section 107. Time domain mapping section 2407 maps chips with spread data on subcarriers in the time domain and outputs data with chips mapped on subcarriers to IFFT section 107.

Figure 25:
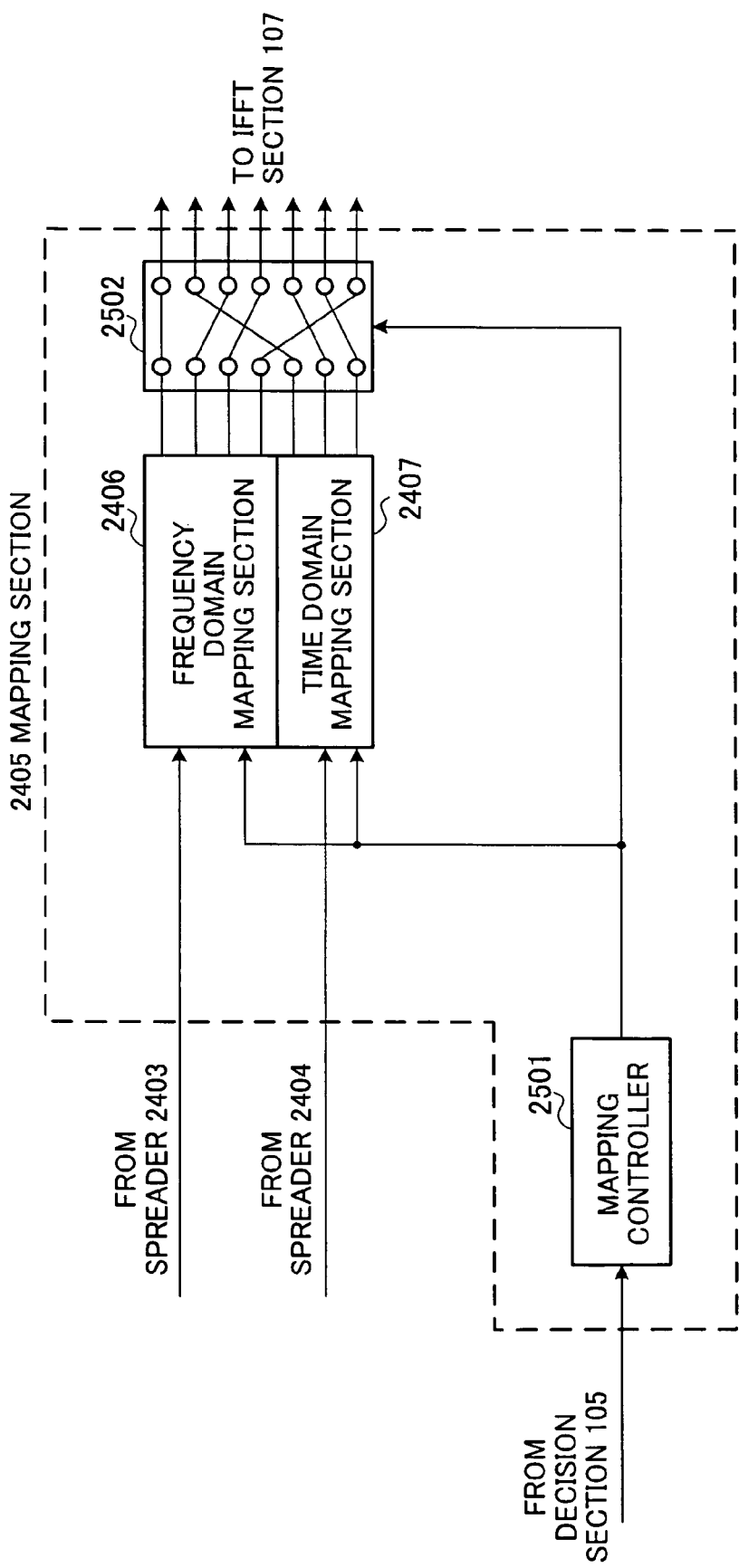
FIG. 25 is a block diagram showing an example of the configuration of the mapping section of the radio communication apparatus of the above described embodiment.

Next, details of mapping section 2405 will be explained. FIG. 25 is a block diagram showing an example of the configuration of the mapping section of the radio communication apparatus of this embodiment.

Mapping controller 2501 outputs the number of subcarriers having propagation channel quality equal to or higher than a predetermined level to time domain mapping section 2407 and outputs the number of subcarriers having propagation channel quality lower than a predetermined level to frequency domain mapping section 2406. Furthermore, mapping controller 2501 outputs the frequencies of subcarriers having propagation channel quality equal to or higher than a predetermined level and the frequencies of subcarriers having propagation channel quality lower than a predetermined level to switch 2502.

For the data output from spreader 2403, frequency domain mapping section 2406 maps chips with spread data on subcarriers in the frequency domain and outputs the chips to switch 2502. Time domain mapping section 2407 maps chips spread at a lower spreading factor on subcarriers in the time domain and outputs the chips to switch 2502.

Switch 2502 outputs chips output from time domain mapping section 2407 to subcarriers having propagation channel quality equal to or higher than a predetermined level and outputs chips output from frequency domain mapping section 2406 to subcarriers having propagation channel quality lower than a predetermined level.

Through the above described operation, radio communication apparatus 2400 maps data to carrier frequencies having propagation channel quality equal to or higher than a predetermined level in the time axis domain and maps data spread at a higher spreading factor than data mapped in the time axis domain to carrier frequencies having propagation channel quality lower than a predetermined level in the frequency domain.

Figure 26:
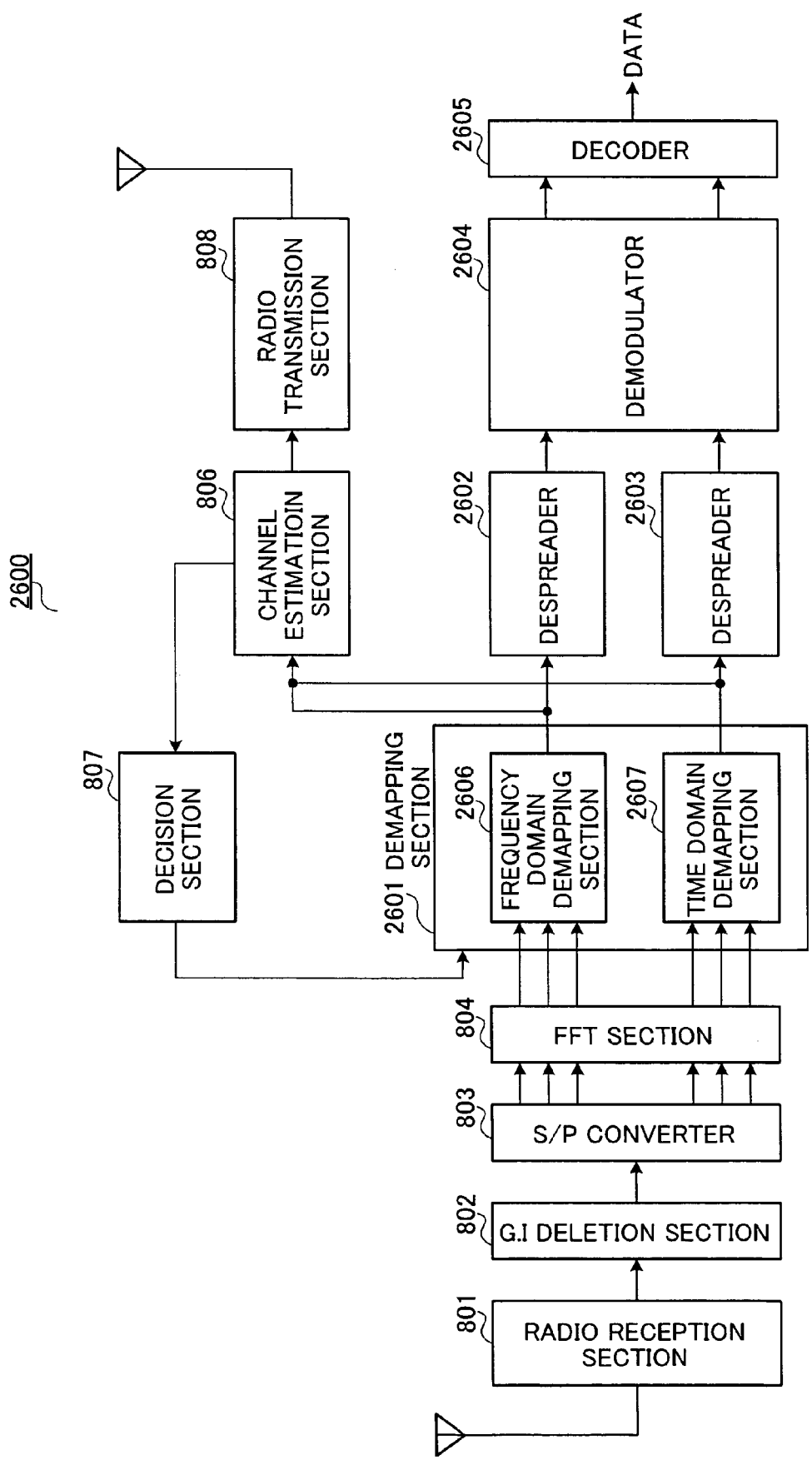
FIG. 26 is another block diagram showing the configuration of the radio communication apparatus according to Embodiment 4 of the present invention.

Next, an example where data transmitted by radio communication apparatus 2400 is received will be explained. FIG. 26 is a block diagram showing the configuration of a radio communication apparatus according to Embodiment 4 of the present invention.

Radio communication apparatus 2600 in FIG. 26 is provided with demapping section 2601, despreader 2602, despreader 2603, demodulator 2604 and decoder 2605, and is different from the radio communication apparatus in FIG. 8 in that symbols spread in the frequency axis domain are despread at a higher spreading factor than symbols spread in the time axis domain. Furthermore, demapping section 2601 is principally comprised of frequency domain demapping section 2606 and time domain demapping section 2607.

Following the decision result of decision section 807, demapping section 2601 unites chips mapped in the time axis domain of received signals of subcarriers having propagation channel quality equal to or higher than a predetermined level into one piece of data and unites chips mapped in the frequency domain of received signals of subcarriers having propagation channel quality lower than a predetermined level into one piece of data.

Despreader 2602 despreads the remapped data and outputs the data to demodulator 2604. Despreader 2603 despreads the remapped data at a lower spreading factor than despreader 2602 and output the data to demodulator 2604. Demodulator 2604 demodulates the received data and outputs the demodulated data to decoder 2605. Decoder 2605 decodes the received data.

Figure 27:
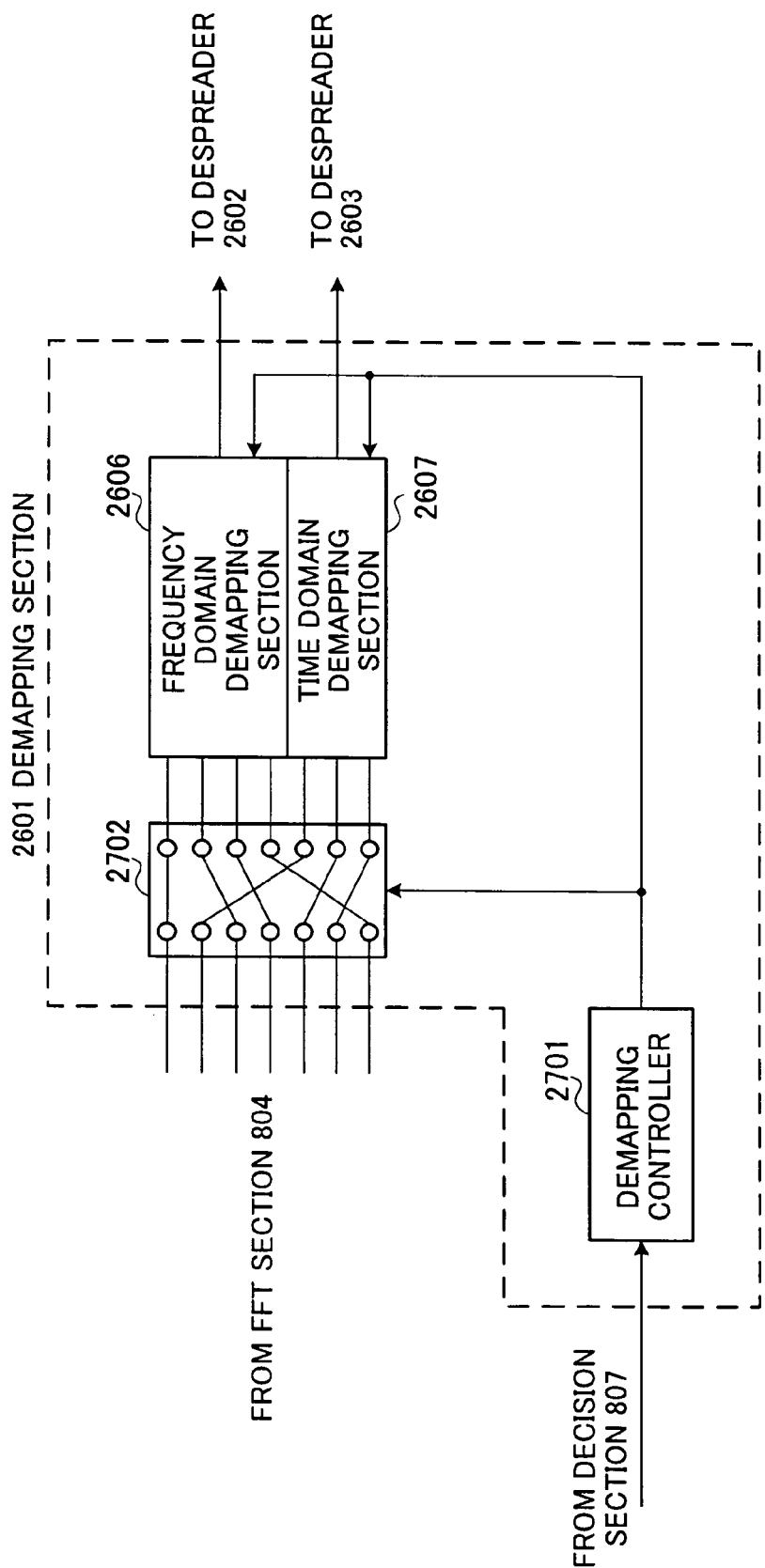
FIG. 27 is a block diagram showing an example of the configuration of a demapping section of the radio communication apparatus of the above described embodiment.

Next, details of demapping section 2601 will be explained. FIG. 27 is a block diagram showing an example of the configuration of the demapping section of the radio communication apparatus of this embodiment. Demapping section 2601 in FIG. 27 is principally constructed of demapping controller 2701, switch 2702, frequency domain demapping section 2606 and time domain demapping section 2607.

Based on the decision result output from decision section 807, demapping controller 2701 controls switch 2702. Furthermore, demapping controller 2701 outputs the frequencies of subcarriers having propagation channel quality equal to or higher than a predetermined level and the frequencies of subcarriers having propagation channel quality lower than a predetermined level to switch 2702.

Demapping controller 2701 outputs the number of subcarriers having propagation channel quality equal to or higher than a predetermined level to time domain demapping section 2607 and outputs the number of subcarriers having propagation channel quality lower than a predetermined level to frequency domain demapping section 2606.

Switch 2702 outputs the received signals transmitted by subcarriers having propagation channel quality equal to or higher than a predetermined level to time domain demapping section 2607 and outputs the received signals transmitted by subcarriers having propagation channel quality lower than a predetermined level to frequency domain demapping section 2606.

Time domain demapping section 2607 unites chips mapped on respective subcarriers in the time domain into one piece of data and outputs the data to despreader 2603. Frequency domain demapping section 2606 unites chips mapped on respective subcarriers in the frequency domain into one piece of data and outputs the data to despreader 2602.

Thus, in an OFDM-CDMA communication, the radio communication apparatus of this embodiment spreads symbols spread in the frequency axis domain at a higher spreading factor than symbols spread in the time axis domain, maps chips on which transmission data is spread on subcarriers having a propagation channel environment better than a predetermined level in the time axis domain, maps chips on subcarriers having a propagation channel environment worse than a predetermined level in the frequency domain, and therefore, it is possible to achieve the effect of maintaining orthogonality among spreading codes when chips are spread in the time domain and the frequency diversity effect when chips are spread in the frequency domain simultaneously.

Embodiment 5

Figure 28:
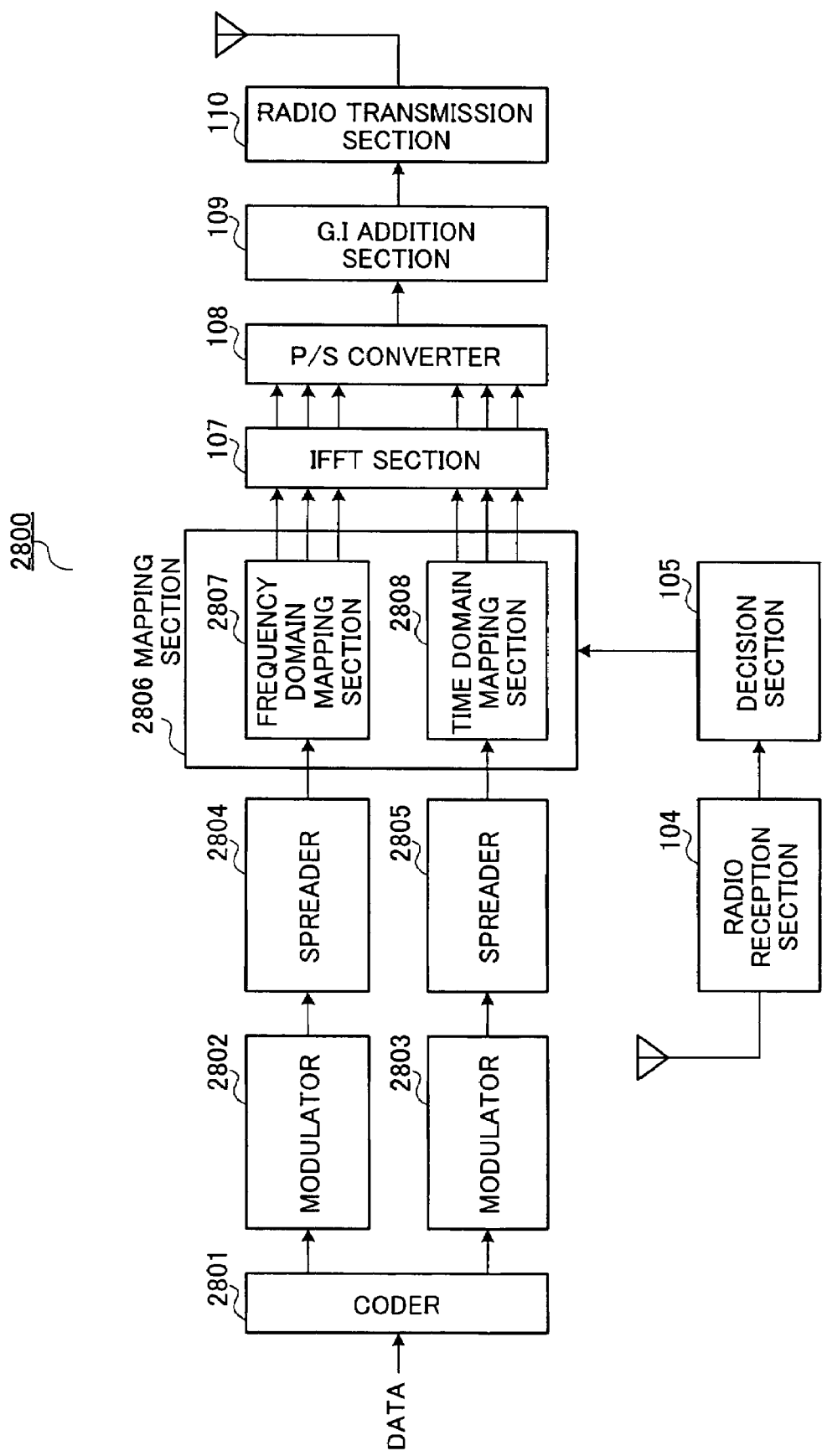
FIG. 28 is a block diagram showing the configuration of a radio communication apparatus according to Embodiment 5 of the present invention.

FIG. 28 is a block diagram showing the configuration of a radio communication apparatus according to Embodiment 5 of the present invention. However, the same components as those in FIG. 1 are assigned the same reference numerals as those in FIG. 1 and detailed explanations thereof will be omitted.

Radio communication apparatus 2800 in FIG. 28 is provided with coder 2801, modulator 2802, modulator 2803, spreader 2804, spreader 2805 and mapping section 2806, and is different from the radio communication apparatus in FIG. 1 in that symbols spread in the time axis domain are modulated under a modulation scheme with a higher M-ary number than symbols spread in the frequency axis domain. Furthermore, mapping section 2806 is principally comprised of frequency domain mapping section 2807 and time domain mapping section 2808.

Coder 2801 codes data to be transmitted, outputs part of the coded data to modulator 2802 and outputs the other part of the data to modulator 2803.

Modulator 2802 modulates the data and outputs the modulated data to spreader 2804. Modulator 2803 modulates the data under a modulation scheme with a higher M-ary number than modulator 2802 and outputs the modulated data to spreader 2805. For example, modulator 2802 modulates the data with BPSK or QPSK and modulator 2803 modulates the data with 16QAM or 64QAM.

Spreader 2804 spreads the data and outputs the spread data to frequency domain mapping section 2807 in mapping section 2806. Spreader 2805 spreads the data and outputs the spread data to time domain mapping section 2808 in mapping section 2806.

Frequency domain mapping section 2807 maps chips with spread data on subcarriers in the frequency domain and outputs the data with chips mapped on subcarriers to IFFT section 107. Time domain mapping section 2808 maps chips with spread data on subcarriers in the time domain and outputs the data with chips mapped on subcarriers to IFFT section 107.

Figure 29:
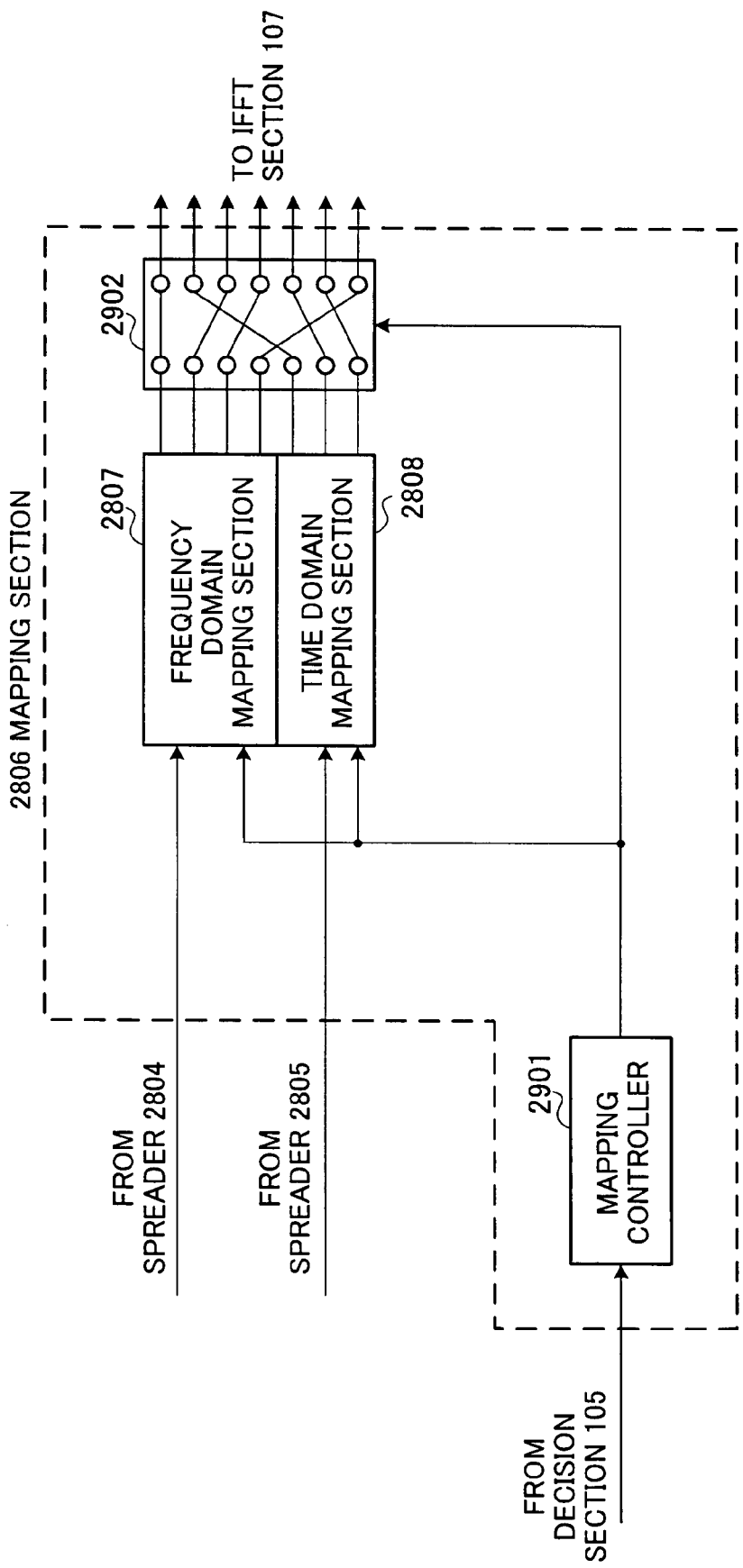
FIG. 29 is a block diagram showing an example of the configuration of the mapping section of the radio communication apparatus of the above described embodiment.

Next, details of mapping section 2806 will be explained. FIG. 29 is a block diagram showing an example of the configuration of the mapping section of the radio communication apparatus of this embodiment.

Mapping controller 2901 outputs the number of subcarriers having propagation channel quality equal to or higher than a predetermined level to time domain mapping section 2808 and outputs the number of subcarriers having propagation channel quality lower than a predetermined level to frequency domain mapping section 2807. Furthermore, mapping controller 2901 outputs the frequencies of subcarriers having propagation channel quality equal to or higher than a predetermined level and the frequencies of subcarriers having propagation channel quality lower than a predetermined level to switch 2902.

For the data output from spreader 2804, frequency domain mapping section 2807 maps chips with spread data on subcarriers in the frequency domain and outputs the chips to switch 2902. For the data modulated under a modulation scheme with a high M-ary number, time domain mapping section 2808 maps chips with spread data on subcarriers in the time domain and outputs the chips to switch 2902.

Switch 2902 outputs the chips output from time domain mapping section 2808 to subcarriers having propagation channel quality equal to or higher than a predetermined level and outputs the chips output from frequency domain mapping section 2807 to subcarriers having propagation channel quality lower than a predetermined level.

Through the above described operation, radio communication apparatus 2800 maps data to carrier frequencies having propagation channel quality lower than a predetermined level in the frequency domain and maps the data modulated under a modulation scheme having a higher M-ary number than symbols spread in the frequency axis domain to carrier frequencies having propagation channel quality equal to or higher than a predetermined level in the time axis domain.

Figure 30:
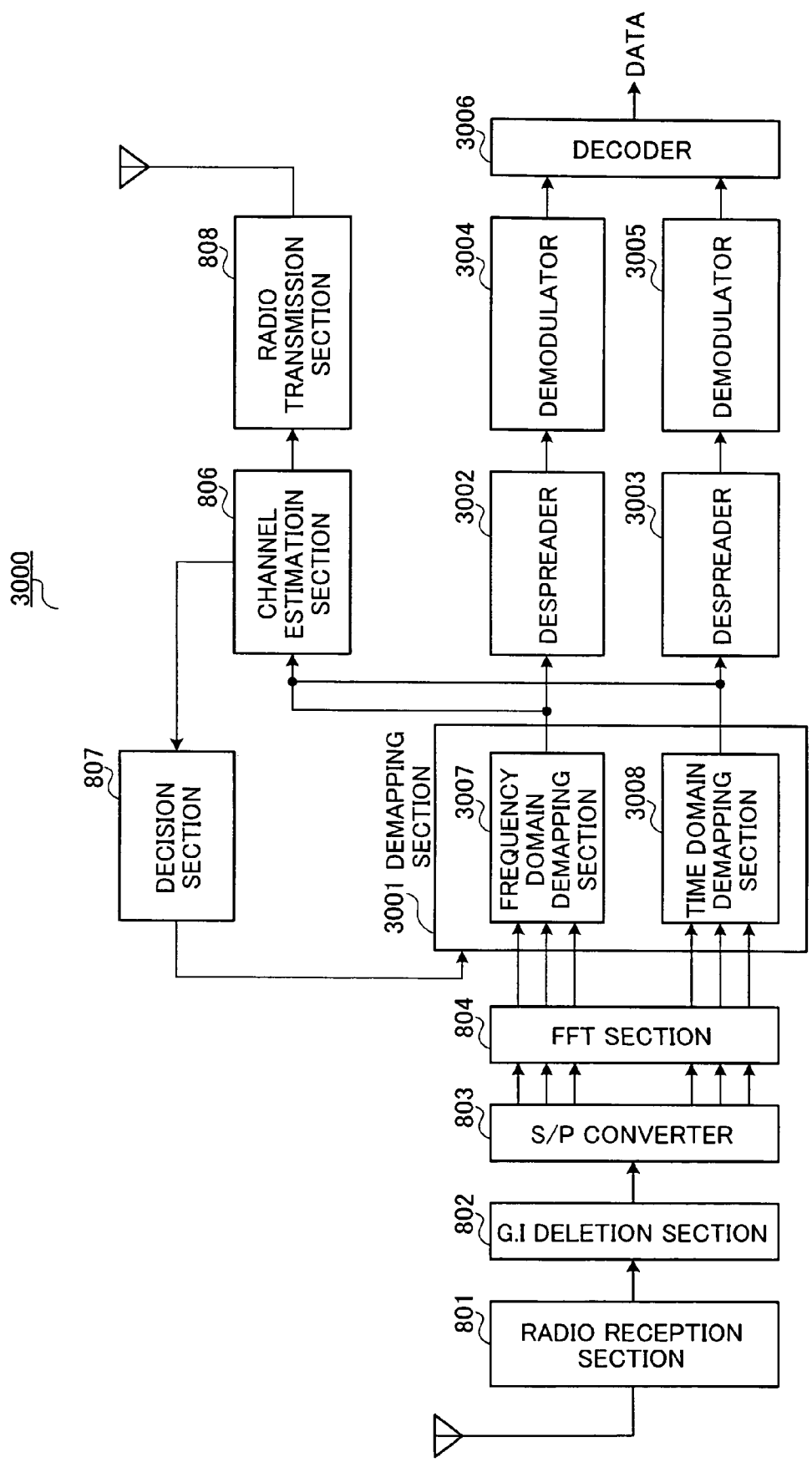
FIG. 30 is another block diagram showing the configuration of the radio communication apparatus according to Embodiment 5 of the present invention.

Next, an example where data transmitted from radio communication apparatus 2800 is received will be explained. FIG. 30 is another block diagram showing the configuration of a radio communication apparatus according to Embodiment 5 of the present invention.

Radio communication apparatus 3000 in FIG. 30 is provided with demapping section 3001, despreader 3002, despreader 3003, demodulator 3004, demodulator 3005 and decoder 3006, and is different from the radio communication apparatus in FIG. 8 in that despread symbols of data spread in the time axis domain are demodulated under a demodulation scheme having a higher M-ary number than despread symbols of data spread in the frequency domain. Furthermore, demapping section 3001 is principally comprised of frequency domain demapping section 3007 and time domain demapping section 3008.

Following the decision result of decision section 807, demapping section 3001 unites chips mapped in the time axis domain of received signals of subcarriers having propagation channel quality equal to or higher than a predetermined level into one piece of data and unites chips mapped in the frequency domain of received signals of subcarriers having propagation channel quality lower than a predetermined level into one piece of data.

Despreader 3002 despreads the remapped data and outputs the despread data to demodulator 3004. Despreader 3003 despreads the remapped data and outputs the despread data to demodulator 3005.

Demodulator 3004 demodulates the received data and outputs the demodulated data to decoder 3006. Demodulator 3005 demodulates the received data under a modulation scheme having a higher M-ary number than demodulator 3004 and outputs the demodulated data to decoder 3006. For example, demodulator 3004 demodulates the data with BPSK or QPSK and demodulator 3005 demodulates the data with 16QAM or 64QAM. Decoder 3006 decodes the received data.

Figure 31:
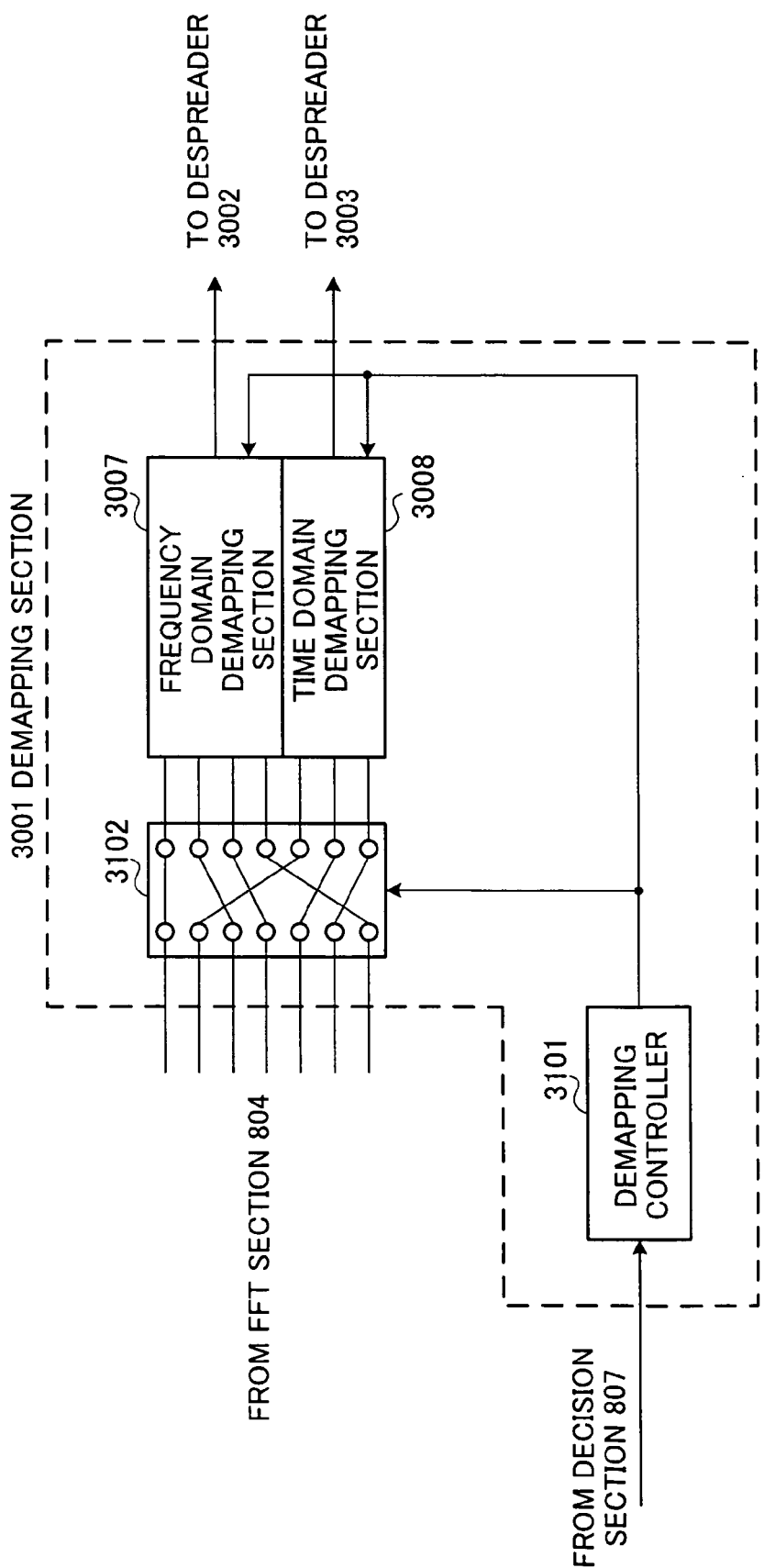
FIG. 31 is a block diagram showing an example of the configuration of a demapping section of the radio communication apparatus of the above described embodiment of the present invention.

Next, details of demapping section 3001 will be explained. FIG. 31 is a block diagram showing an example of the configuration of the demapping section of the radio communication apparatus of this embodiment. Demapping section 3001 in FIG. 31 is principally comprised of demapping controller 3101, switch 3102, frequency domain demapping section 3007 and time domain demapping section 3008.

Based on the decision result output from decision section 807, demapping controller 3101 controls switch 3102. Furthermore, demapping controller 3101 outputs the frequencies of subcarriers having propagation channel quality equal to or higher than a predetermined level and the frequencies of subcarriers having propagation channel quality lower than a predetermined level to switch 3102.

Demapping controller 3101 outputs the number of subcarriers having propagation channel quality equal to or higher than a predetermined level to time domain demapping section 3008 and outputs the number of subcarriers having propagation channel quality lower than a predetermined level to frequency domain demapping section 3007.

Switch 3102 outputs the received signals transmitted with subcarriers having propagation channel quality equal to or higher than a predetermined level to time domain demapping section 3008 and outputs the received signal transmitted with subcarriers having propagation channel quality lower than a predetermined level to frequency domain demapping section 3007.

Time domain demapping section 3008 unites chips mapped on respective subcarriers in the time domain into one piece of data and outputs the data to despreader 3003. Frequency domain demapping section 3007 unites chips mapped on respective subcarriers in the frequency domain into one piece of data and outputs the data to despreader 3002.

Thus, in an OFDM-CDMA communication, the radio communication apparatus of this embodiment modulates symbols spread in the time axis domain under a modulation scheme having a higher M-ary number than symbols spread in the frequency axis domain, maps chips on which transmission data is spread on subcarriers having a propagation channel environment better than a predetermined level in the time axis domain and maps chips with spread data modulated under a modulation scheme having a low M-ary number or using no multivalues on subcarriers having a propagation channel environment worse than a predetermined level in the frequency domain, and therefore, it is possible to achieve the effect of maintaining orthogonality among spreading codes when chips are spread in the time domain and the frequency diversity effect when chips are spread in the frequency domain simultaneously.

The above described mapping in the frequency domain may also be performed two-dimensionally, in the time axis and frequency axis.

Furthermore, the above described modulator and demodulator have been explained with a combination of BPSK or QPSK and 16QAM or 64QAM, but the multivalue modulation/demodulation scheme is not limited to the above described combination.

Furthermore, in the above described explanations, an inverse Fourier transform and fast Fourier transform are used as the methods of super imposing data on a plurality of sub-carriers, but it is also possible to use orthogonal transform such as discrete cosine transform.

In the present invention, there is no limit to the order in the arrangement of chips in the time domain and the arrangement of chips in the frequency domain and any one of the two can be performed first.

Furthermore, the respective function blocks used in the explanations of the above described embodiments are typically expressed as an LSI which is an integrated circuit. These may be integrated into a single chip individually or may be integrated into a single chip so as to include some or all of the function blocks.

Here, an LSI is used, but the LSI may be called IC, system LSI, super LSI or ultra LSI depending on the difference in the degree of integration.

Furthermore, the technique of implementing an integrated circuit is not limited to an LSI and the technique may also be realized with a dedicated circuit or general-purpose processor. It is also possible to use an FPGA (Field Programmable Gate Array) which is programmable after manufacturing of an LSI or a reconfigurable processor which allows connections and settings of circuit cells in the LSI to be reconstructed.

Moreover, with the advance of semiconductor technologies or different technologies derived therefrom, if a technique of implementing an integrated circuit which can substitute for an LSI appears, integration of the function blocks can be naturally realized using such a technology. For example, biotechnology may be possibly applied.

The present application is based on Japanese Patent Application No. 2002-238530 filed on Aug. 19, 2002 and Japanese Patent Application No. 2003-295614 filed on Aug. 19, 2003, entire content of which is expressly incorporated by reference herein.

INDUSTRIAL APPLICABILITY

The present invention is suitable for use in a radio communication apparatus, communication terminal apparatus and base station apparatus combining OFDM and CDMA.

FIG. 1
DATA
101 CODER
102 MODULATOR
103 SPREADER
106 MAPPING SECTION
107 IFFT SECTION
108 P/S CONVERTER
109 G.I ADDITION SECTION
110 RADIO TRANSMISSION SECTION
104 RADIO RECEPTION SECTION
105 DECISION SECTION

FIG. 5
FROM MODULATOR 102
103 SPREADER
106 MAPPING SECTION
504 FREQUENCY DOMAIN MAPPING SECTION
503 TIME DOMAIN MAPPING SECTION
TO IFFT SECTION 107
FROM DECISION SECTION 105
501 MAPPING CONTROL SECTION

FIG. 8
807 DECISION SECTION
806 CHANNEL ESTIMATION SECTION
808 RADIO TRANSMISSION SECTION
801 RADIO RECEPTION SECTION
802 G.I DELETION SECTION
803 S/P CONVERSION SECTION
804 FFT SECTION
805 DEMAPPING SECTION
809 DESPREADER
810 DEMODULATOR
811 DECODER
DATA

FIG. 9
805 DEMAPPING SECTION
FROM FFT SECTION 804
904 FREQUENCY DOMAIN DEMAPPING SECTION
903 TIME DOMAIN DEMAPPING SECTION
TO DESPREADER 809
FROM DECISION SECTION 807
901 DEMAPPING CONTROLLER

FIG. 10
106 MAPPING SECTION
FROM MODULATOR 102
103 SPREADER
1001 TWO-DIMENSIONAL MAPPING SECTION
503 TIME DOMAIN MAPPING SECTION
TO IFFT SECTION 107
FROM DECISION SECTION 105
501 MAPPING CONTROLLER

FIG. 11
1101 THRESHOLD

FIG. 13
805 DEMAPPING SECTION
FROM FFT SECTION 804
1301 TWO-DIMENSIONAL DEMAPPING SECTION
903 TIME DOMAIN DEMAPPING SECTION
TO DESPREADER 809
FROM DECISION SECTION 807
901 DEMAPPING CONTROLLER

FIG. 14
DATA
DATA
1401 CODER
1402 MODULATOR
1403 MODULATOR
1404 SPREADER
1405 SPREADER
1406 MAPPING SECTION
1407 TWO-DIMENSIONAL MAPPING SECTION
1408 TIME DOMAIN MAPPING SECTION
107 IFFT SECTION
108 P/S CONVERTER
109 G.I ADDITION SECTION
110 RADIO TRANSMISSION SECTION

FIG. 15
REDUNDANT BIT SPREADING CHIP
INFORMATION BIT SPREADING CHIP

FIG. 17
801 RADIO RECEPTION SECTION
802 G.I DELETION SECTION
803 S/P CONVERSION SECTION
804 FFT SECTION
DEMAPPING SECTION
1707 TWO-DIMENSIONAL DEMAPPING SECTION
1708 TIME DOMAIN DEMAPPING SECTION
1702 DESPREADER
1703 DESPREADER
1704 DEMODULATOR
1705 DEMODULATOR
1706 DECODER
DATA
DATA

FIG. 18
DATA
DATA
1801 CODER
1802 CODER
1803 MODULATOR
1804 MODULATOR
1805 SPREADER
1806 SPREADER
1807 MAPPING SECTION
107 IFFT SECTION
108 P/S CONVERTER
109 G.I ADDITION SECTION
110 RADIO TRANSMISSION SECTION

FIG. 19
1805 SPREADER
HIGH CODING RATE DATA
1806 SPREADER
LOW CODING RATE DATA
1807 MAPPING SECTION
1901 TWO-DIMENSIONAL MAPPING SECTION
1902 TIME DOMAIN MAPPING SECTION
TO IFFT SECTION 107

FIG. 20
HIGH CODING RATE DATA SPREADING CHIP
LOW CODING RATE DATA SPREADING CHIP

FIG. 22
801 RADIO RECEPTION SECTION
802 G.I DELETION SECTION
803 S/P CONVERSION SECTION
804 FFT SECTION
2201 DEMAPPING SECTION
2202 DESPREADER
2203 DESPREADER
2204 DEMODULATOR
2205 DEMODULATOR
2206 DECODER
2207 DECODER
DATA
DATA

FIG. 23
FROM FFT SECTION 804
2201 DEMAPPING SECTION
2301 TWO-DIMENSIONAL DEMAPPING SECTION
2302 TIME DOMAIN DEMAPPING SECTION
2202 DESPREADER
2203 DESPREADER

FIG. 24
DATA
2401 CODER
2402 MODULATOR
2403 SPREADER
2404 SPREADER
2405 MAPPING SECTION
2406 FREQUENCY DOMAIN MAPPING SECTION
2407 TIME DOMAIN MAPPING SECTION
104 RADIO RECEPTION SECTION
105 DECISION SECTION
107 IFFT SECTION
108 P/S CONVERTER
109 G.I ADDITION SECTION
110 RADIO TRANSMISSION SECTION

FIG. 25
2405 MAPPING SECTION
FROM SPREADER 2403
FROM SPREADER 2404
FROM DECISION SECTION 105
2501 MAPPING CONTROLLER
2406 FREQUENCY DOMAIN MAPPING SECTION
2407 TIME DOMAIN MAPPING SECTION
TO IFFT SECTION 107

FIG. 26
807 DECISION SECTION
806 CHANNEL ESTIMATIOIN SECTION
808 RADIO TRANSMISSION SECTION
801 RADIO RECEPTION SECTION
802 G.I DELETION SECTION
803 S/P CONVERTER
804 FFT SECTION
2601 DEMAPPING SECTION
2606 FREQUENCY DOMAIN DEMAPPING SECTION
2607 TIME DOMAIN DEMAPPING SECTION
2602 DESPREADER
2603 DESPREADER
2604 DEMODULATOR
2605 DECODER
DATA

FIG. 27
2601 DEMAPPING SECTION
FROM FFT SECTION 804
FROM DECISION SECTION 807
2701 DEMAPPING CONTROLLER
2606 FREQUENCY DOMAIN DEMAPPING SECTION
2607 TIME DOMAIN DEMAPPING SECTION
TO DESPREADER 2602
TO DESPREADER 2603

FIG. 28
DATA
2801 CODER
2802 MODULATOR
2803 MODULATOR
2804 SPREADER
2805 SPREADER
2806 MAPPING SECTION
2807 FREQUENCY DOMAIN MAPPING SECTION
2808 TIME DOMAIN MAPPING SECTION
107 IFFT SECTION
108 P/S CONVERTER
109 G.I ADDITION SECTION
110 RADIO TRANSMISSION SECTION
104 RADIO RECEPTION SECTION
105 DECISION SECTION

FIG. 29
2806 MAPPING SECTION
FROM SPREADER 2804
FROM SPREADER 2805
FROM DECISION SECTION 105
2901 MAPPING CONTROLLER
2807 FREQUENCY DOMAIN MAPPING SECTION
2808 TIME DOMAIN MAPPING SECTION
TO IFFT SECTION 107

FIG. 30
807 DECISION SECTION
806 CHANNEL ESTIMATIOIN SECTION
808 RADIO TRANSMISSION SECTION
801 RADIO RECEPTION SECTION
802 G.I DELETION SECTION
803 S/P CONVERTER
804 FFT SECTION
3001 DEMAPPING SECTION
3007 FREQUENCY DOMAIN DEMAPPING SECTION
3008 TIME DOMAIN DEMAPPING SECTION
3002 DESPREADER
3003 DESPREADER
3004 DEMODULATOR
3005 DEMODULATOR
3006 DECODER
DATA

FIG. 31
3001 DEMAPPING SECTION
FROM FFT SECTION 804
FROM DECISION SECTION 807
3101 DEMAPPING CONTROLLER
3007 FREQUENCY DOMAIN DEMAPPING SECTION
3008 TIME DOMAIN DEMAPPING SECTION
TO DESPREADER 3002
TO DESPREADER 3003

The invention claimed is:

1. A radio transmission apparatus that transmits a radio signal consisting of a plurality of subcarriers, comprising:
a modulator that modulates transmission data using a first modulation scheme to obtain first modulated data and modulates the transmission data using a second modulation scheme of a higher M-ary number than said first modulation scheme to obtain second modulated data;
a spreader that spreads said first modulated data to obtain a plurality of first chips and spreads said second modulated data to obtain a plurality of second chips; and
a mapping unit that maps said first chips on a plurality of first subcarriers mapped in a frequency domain and maps said second chips on a plurality of second subcarriers mapped in a time domain.

2. The radio transmission apparatus according to claim 1, wherein said mapping unit maps said first chips on both said first subcarriers and said second subcarriers.

3. The radio transmission apparatus according to claim 1, wherein said mapping unit uses subcarriers having propagation channel quality lower than a predetermined level as said first subcarriers.

4. The radio transmission apparatus according to claim 1, wherein said mapping unit uses subcarriers having propagation channel quality equal to or higher than a predetermined level as said second subcarriers.

5. A radio reception apparatus that receives said radio signal transmitted from the radio transmission apparatus according to claim 1, comprising:
a despreader that despreads said first chips to obtain said first modulated data and despreads said second chips to obtain said second modulated data; and
a demodulator that demodulates said first modulated data using said first modulation scheme and demodulates said second modulated data using said second modulation scheme.

6. A radio transmission method for transmitting a radio signal consisting of a plurality of subcarriers, comprising the steps of:
modulating transmission data using a first modulation scheme to obtain first modulated data and modulating the transmission data using a second modulation scheme of a higher M-ary number than said first modulation scheme to obtain second modulated data;
spreading said first modulated data to obtain a plurality of first chips and spreading said second modulated data to obtain a plurality of second chips; and
mapping said first chips on a plurality of first subcarriers mapped in the frequency domain and mapping said second chips on a plurality of second subcarriers mapped in the time domain.

* * * * *

UNITED STATES PATENT AND TRADEMARK OFFICE
CERTIFICATE OF CORRECTION

PATENT NO. : 7,580,345 B2
APPLICATION NO. : 10/568448
DATED : August 25, 2009
INVENTOR(S) : Atsushi Matsumoto et al.

It is certified that error appears in the above-identified patent and that said Letters Patent is hereby corrected as shown below:

On the title page, Item (54) and col. 1, lines 1-3: Title currently reads:

RADIO TRANSMITTING APPARATUS AND RADIO TRANSMITTING METHOD and should read:

APPARATUS AND METHOD FOR RADIO TRANSMISSION

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,580,345 B2  
APPLICATION NO. : 10/568448  
DATED : August 25, 2009  
INVENTOR(S) : Matsumoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 635 days.

Signed and Sealed this

Fourteenth Day of September, 2010

David J. Kappos
*Director of the United States Patent and Trademark Office*